(12) United States Patent
Kudo et al.

(10) Patent No.: US 7,206,792 B2
(45) Date of Patent: *Apr. 17, 2007

(54) DATA MANAGEMENT APPARATUS

(75) Inventors: Shigetaka Kudo, Tokyo (JP); Natsumi Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 281 days.

This patent is subject to a terminal disclaimer.

(21) Appl. No.: 10/276,191

(22) PCT Filed: Mar. 15, 2002

(86) PCT No.: PCT/JP02/02504

§ 371 (c)(1),
(2), (4) Date: Apr. 1, 2003

(87) PCT Pub. No.: WO02/075741

PCT Pub. Date: Sep. 26, 2002

(65) Prior Publication Data

US 2004/0039722 A1 Feb. 26, 2004

(30) Foreign Application Priority Data

Mar. 15, 2001 (JP) ............................ 2001-73905

(51) Int. Cl.
*G06F 17/00* (2006.01)
*G06F 7/00* (2006.01)
*G06F 15/16* (2006.01)

(52) U.S. Cl. ............... 707/104.1; 707/10; 709/218

(58) Field of Classification Search .............. 707/104, 707/10, 104.1
See application file for complete search history.

(56) References Cited

U.S. PATENT DOCUMENTS 5,751,672 A 5/1998 Yankowski (Continued)

FOREIGN PATENT DOCUMENTS

EP 0 977 200 A1 2/2000

(Continued)

OTHER PUBLICATIONS

Supplementary European Search Report for Application No. 02705261.2-2223 PCT/JP0202504, dated Nov. 18, 2005.

*Primary Examiner*—John Cottingham
*Assistant Examiner*—Kuen S. Lu
(74) *Attorney, Agent, or Firm*—Finnegan, Henderson, Farabow, Garrett & Dunner, L.L.P.

(57) ABSTRACT

The present invention is concerned with a data management apparatus, in which data recorded by dubbing from a CD-DA (Compact Disc Digital Audio) to a hard disc drive (HDD) (31) as a second recording medium are supervised by a hard disc recording and/or reproducing unit (3), which hard disc recording and/or reproducing unit (3) supervises the identification information of the CD-DA to enable the supplementary information to be obtained via communication means from a network server, and in which the so produced supplementary information is automatically registered in the hard disc recording and/or reproducing unit (3) to permit the supplementary information, such as the name of music airs, to be produced even in the absence of a user's input.

7 Claims, 19 Drawing Sheets

U.S. PATENT DOCUMENTS

| | | | |
|---|---|---|---|
| 5,987,525 | A | 11/1999 | Roberts et al. |
| 5,999,698 | A * | 12/1999 | Nakai et al. ................. 386/125 |
| 6,006,004 | A * | 12/1999 | Moriyama et al. ............ 386/46 |
| 6,031,795 | A | 2/2000 | Wehmeyer |
| 6,031,797 | A | 2/2000 | Van Ryzin et al. |
| 6,034,925 | A | 3/2000 | Wehmeyer |
| 6,061,680 | A | 5/2000 | Scherf et al. |
| 6,128,255 | A | 10/2000 | Yankowski |
| 6,128,625 | A | 10/2000 | Yankowski |
| 6,147,940 | A | 11/2000 | Yankowski |
| 6,154,773 | A | 11/2000 | Roberts et al. |
| 6,161,132 | A | 12/2000 | Roberts et al. |
| 6,167,189 | A * | 12/2000 | Taira et al. .................... 386/95 |
| 6,222,807 | B1 | 4/2001 | Min-Jae |
| 6,243,328 | B1 * | 6/2001 | Fenner et al. ............. 707/104.1 |
| 6,272,078 | B2 | 8/2001 | Yankowski |
| 6,288,991 | B1 | 9/2001 | Kajiyama et al. |
| 6,388,957 | B2 | 5/2002 | Yankowski |
| 6,389,399 | B1 | 5/2002 | Yasuda |
| 6,393,430 | B1 | 5/2002 | Van Ryzin |
| 6,434,103 | B1 | 8/2002 | Shitara et al. |
| 6,661,746 | B2 * | 12/2003 | Tagawa et al. .......... 369/30.09 |
| 2002/0031065 | A1 * | 3/2002 | Kajiyama et al. ........ 369/47.23 |
| 2002/0138442 | A1 * | 9/2002 | Hori et al. .................... 705/59 |

FOREIGN PATENT DOCUMENTS

| | | |
|---|---|---|
| JP | 08-037506 | 2/1996 |
| JP | 08-138357 | 5/1996 |
| JP | 08-147948 | 6/1996 |
| JP | 08-306124 | 11/1996 |
| JP | 08-306170 | 11/1996 |
| JP | 10-116472 | 5/1998 |
| JP | 10 116472 | 6/1998 |
| JP | 10-233081 | 9/1998 |
| JP | 10-233083 | 9/1998 |
| JP | 11-46340 | 2/1999 |
| JP | 11 259971 | 9/1999 |
| JP | 11-514482 | 12/1999 |
| JP | 2000-57747 | 2/2000 |
| JP | 2000-215653 | 8/2000 |
| JP | 3104628 | 9/2000 |
| JP | 2000-315217 | 11/2000 |
| JP | 2000-322297 | 11/2000 |
| JP | 2000-322451 | 11/2000 |
| JP | 2000-331468 | 11/2000 |
| JP | 2001-101006 | 4/2001 |
| JP | 2001-273748 | 10/2001 |
| JP | 2001-283568 | 10/2001 |
| JP | 2001-297084 | 10/2001 |
| JP | 2001-297514 | 10/2001 |
| JP | 2001-297571 | 10/2001 |
| JP | 2001-312496 | 11/2001 |
| JP | 2001-312877 | 11/2001 |
| JP | 2001-313892 | 11/2001 |
| JP | 2002-041527 | 2/2002 |
| WO | WO97-05616 | 2/1997 |
| WO | WO98-25269 | 6/1998 |
| WO | WO98-47080 | 10/1998 |
| WO | WO 99/63525 A2 | 12/1999 |
| WO | WO 02/43395 A2 | 5/2002 |

* cited by examiner

| | |
|---|---|
| 98n+1 | SYNCHRONIZATION PATTERN |
| 98n+2 | SYNCHRONIZATION PATTERN |
| 98n+3 | P1 Q1 R1 S1 T1 U1 V1 W1 |
| 98n+4 | P2 Q2 R2 S2 T2 U2 V2 W2 |
| ⋮ | ⋮ |
| 98n+97 | P95 Q95 R95 S95 T95 U95 V95 W95 |
| 98n+98 | P96 Q96 R96 S96 T96 U96 V96 W96 |
| 98(n+1)+1 | |

FIG.6A

| Q1~Q4 CONTROL | Q5~Q8 ADR | Q9~Q80 SUB-Q-DATA | Q81~Q96 CRC |
|---|---|---|---|

FIG.6B

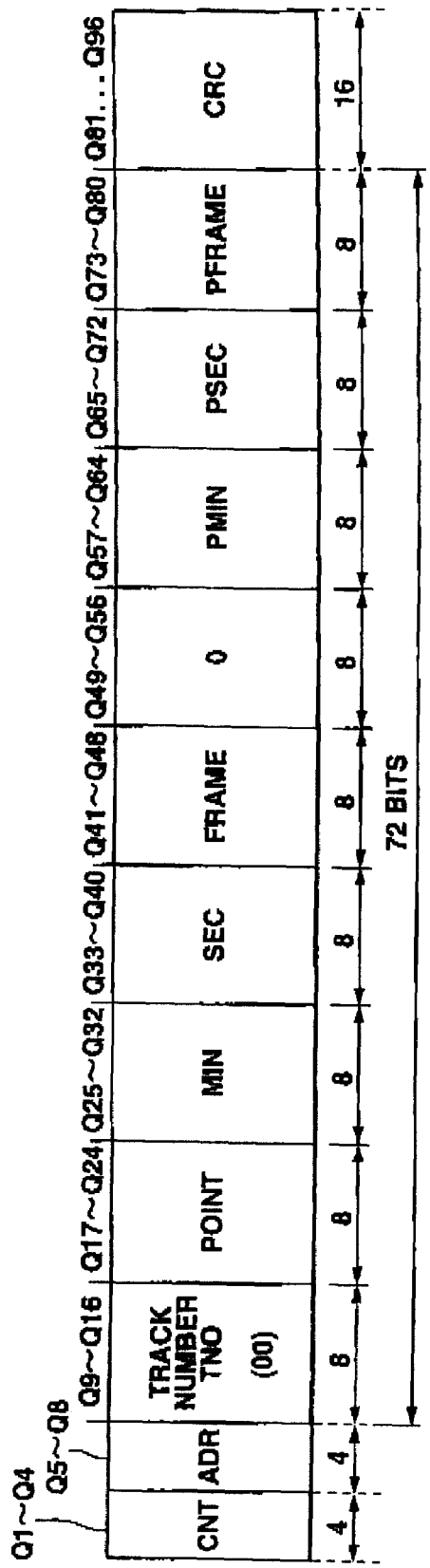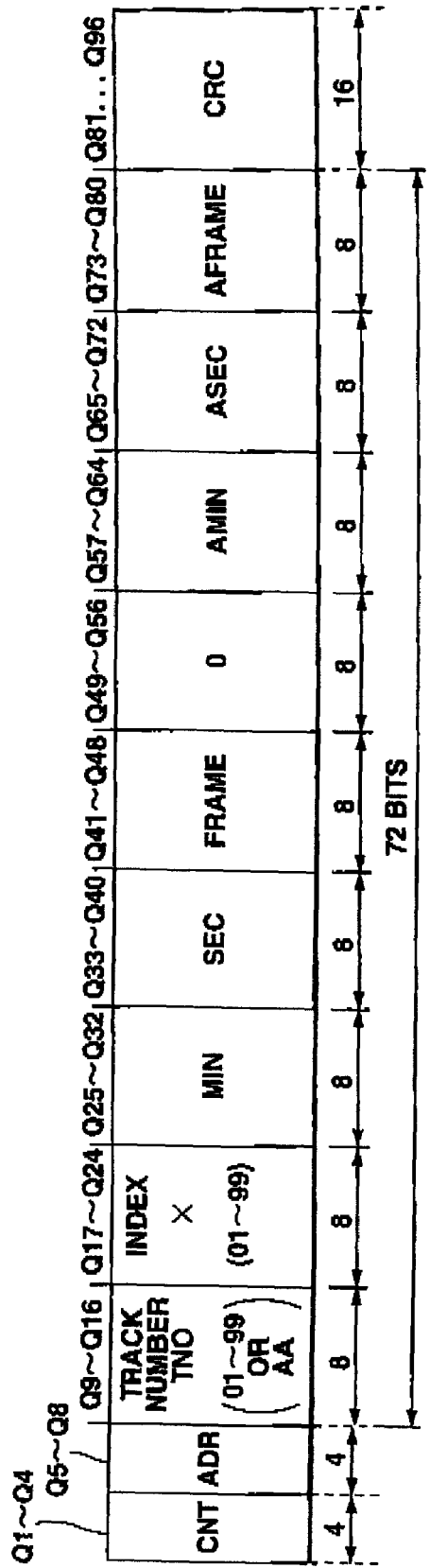

| TNO | BLOCK NOS. | POINT | PMIN, PSEC, PFRAME | |
|---|---|---|---|---|
| 00 | n | 01 | 00. 02. 32 | START POINT OF TRACK #1 |
| ↓ | n+1 | 01 | 00. 02. 32 | |
| | n+2 | 01 | 00. 02. 32 | |
| | n+3 | 02 | 10. 15. 12 | START POINT OF TRACK #2 |
| | n+4 | 02 | 10. 15. 12 | |
| | n+5 | 02 | 10. 15. 12 | |
| | n+6 | 03 | 16. 28. 63 | START POINT OF TRACK #3 |
| | n+7 | 03 | 16. 28. 63 | |
| | n+8 | 03 | 16. 28. 63 | |
| | n+9 | 04 | 20. 15. 00 | START POINT OF TRACK #4 |
| | n+10 | 04 | 20. 15. 00 | |
| | n+11 | 04 | 20. 15. 00 | |
| | n+12 | 05 | 36. 00. 74 | START POINT OF TRACK #5 |
| | n+13 | 05 | 36. 00. 74 | |
| | n+14 | 05 | 36. 00. 74 | |
| | n+15 | 06 | 49. 10. 03 | START POINT OF TRACK #6 |
| | n+16 | 06 | 49. 10. 03 | |
| | n+17 | 06 | 49. 10. 03 | |
| | n+18 | A0 | 01. 00. 00 | TRACK NUMBER OF FIRST TRACK OF DISC |
| | n+19 | A0 | 01. 00. 00 | |
| | n+20 | A0 | 01. 00. 00 | |
| | n+21 | A1 | 06. 00. 00 | TRACK NUMBER OF LAST TRACK OF DISC |
| | n+22 | A1 | 06. 00. 00 | |
| | n+23 | A1 | 06. 00. 00 | |
| | n+24 | A2 | 52. 48. 41 | START POINT OF LEADOUT TRACK |
| | n+25 | A2 | 52. 48. 41 | |
| 00 | n+26 | A2 | 52. 48. 41 | |
| 00 | n+27 | 01 | 00. 02. 32 | REPEAT |
| ↓ | n+28 | 01 | 00. 02. 32 | |
| | ⋮ | ⋮ | ⋮ ⋮ | |

FIG.8

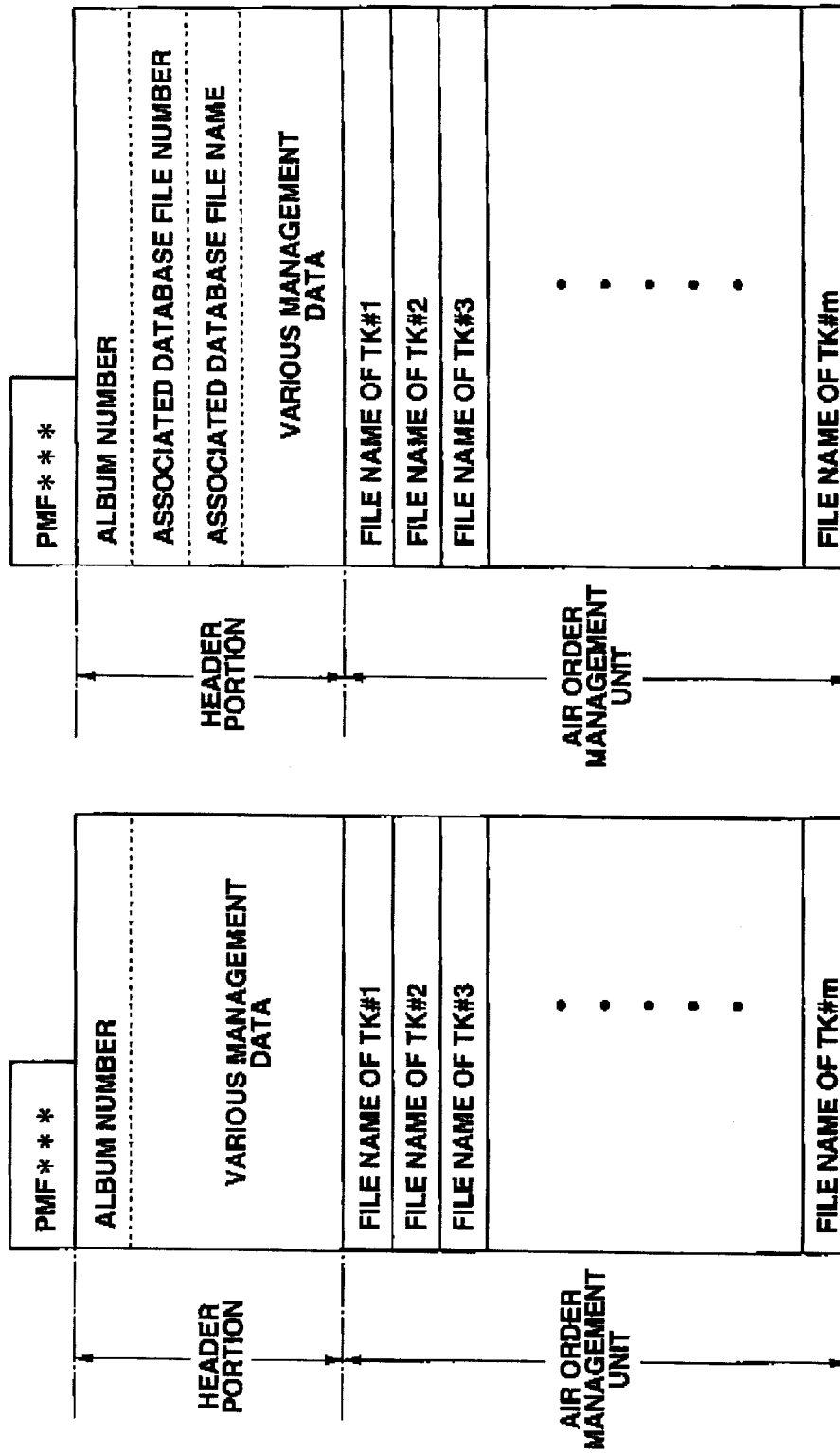

DATA MANAGEMENT APPARATUS

TECHNICAL FIELD

This invention relates to a data management apparatus in which, when data is to be recorded by dubbing from a first portable recording medium, such as a CD-DA (Compact Disc Digital Audio) to a second recording medium, such as a hard disc drive (HDD), recorded data, such as music, is supervised by a database, and in which, the supplementary information, such as name of the music air or an album, is acquired from an outside server, as information site, such as Internet, for registration automatically in a database.

BACKGROUND ART

As equipment for coping with a recording medium, having audio data recorded thereon, a CD player, or recording and/or reproducing apparatus, employing a magneto-optical disc, having a diameter of 64 mm, that is MD (Mini-Disc) (trademark), as a recording medium, is now in use.

On the part of the user, the operation of dubbing a music air recorded in e.g., a CD, on a MD, is sometimes carried out by way of dubbing audio data, as an example.

It has recently been proposed to record e.g., music airs, recorded on a portable recording medium, such as CD or MD, on a hard disc drive (HDD), by way of dubbing, and to use the HDD for example as a music providing server.

In the CD or MD, one or more programs (tracks) are recorded, with a sole music number, for example, as a program or a track, with the entire programs or tracks making up a sole album. In the operation of dubbing the CD or the MD, as a recording source, to another recording medium, the dubbing operation may be performed on the CD in its entirety, that is on the album basis, or on only the track(s) as specified by the user.

It should be noted that, in certain conventional audio equipment, not only the music data but also the supplementary information for the entire album or the individual music number(s) can be recorded. The supplementary information here refers to text data, such as album name or the name of the music air(s), recording date and time, or copyright information (SRC: International Standard Recording Code). In the case of a Mini_Disc (MD) system, for example, the names of the music air, album name or the recording date and time can be recorded in association with each recorded music number or the entire album. However, in inputting the text data, such as the names of the music airs, the user has to enter the text using an operating system of an MD recording device by an extremely laborious operation. In many cases, a large number of users merely enjoy the music, without inputting the names of the music airs or album names.

Although the recording equipment may be connected to a PC (personal computer) to make use of the PC keyboard as an aid in inputting the text, this cannot be said to relieve the user of the load in inputting the music air name or album name.

Moreover, if the user is to input text data, such as the name of the music air, he or she must grasp, as a matter of course, from which track number of the CD a music air now recorded has been recorded by dubbing. For example, if the user selectively recorded plural music airs from a large number of CDs, there may be occasions where the names of the music air, recorded on the MD, become unclear, that is the user is unable to input the names of the music numbers, unless the user is well aware of the music airs.

It may also occur frequently that, in the case of an apparatus adapted for dubbing a large number of CDs to an HDD, the relationship of correspondence between the music airs recorded by dubbing on the HDD and the CDs as the recording source becomes unclear for the user.

As outside servers, such as music air information sites, such as the Internet, there are many services of presenting the names of the music airs recorded on a CD and the supplementary information. If it has become unclear from which CD the CD album recorded by dubbing to e.g., a HDD is originated, it becomes impossible to enjoy the services presented by the outside servers.

That is, although correlated recording of the supplementary information in association with data, such as music data, recorded on the recording medium, has recently been achieved in a variety of recording systems, there are many cases where the information which relies to some extent on the user input, such as text information, is actually not recorded in these systems, such that, in many cases, the text information cannot be utilized effectively.

DISCLOSURE OF THE INVENTION

In view of the above depicted status of the art, it is an object of the present invention to provide a data management apparatus in which, when data may be recorded by dubbing from a first portable recording medium, such as a CD-DA (Compact Disc Digital Audio), to a second recording medium, having an extremely large storage capacity, such as a hard disc drive (HDD), and the data so recorded by dubbing may be supervised, the apparatus acquires the supplementary information automatically, that is even in the absence of actuation by the user, and executes registration and management in association with the data, such as music airs, thereby enhancing the ease in use and convenience for the user.

For accomplishing the object, the present invention provides a data management apparatus including reproducing means for reproducing a portable first recording medium, recording and/or reproducing means for recording and/or reproducing a second recording medium having a capacity larger than that of music first recording medium, database means for storing the identification information medium and the supplementary information of music first recording, in association with data reproduced from music reproducing means by music reproducing means and recorded on music second recording medium by music recording and/or reproducing means, communication means for communicating with an external server holding the various supplementary information in association with music first recording medium, and controlling means for causing music communication means to transmit the identification information of music first recording medium, supervised by music database means in association with the data recorded on music second recording medium, by music communication means to music external server, to have the supplementary information pertinent to music first recording medium received from music external server to have the so received supplementary information stored in music database means in association with music identification information.

In the data management apparatus according to the present invention, one or more programs (tracks) and the management information for supervising the program are recorded on the first recording medium and the identification information is generated based on the management information.

In the first recording medium, there are recorded one or more programs, and data reproduced from the first recording medium by the reproducing means and recorded on the second recording medium by the recording and/or reproducing means is made program-based data. If the database means forms a database with a database file including the identification information and the supplementary information as one unit, the program-based data recorded on the second recording medium includes the pointer information indicating the database file associated with the data.

There is provided a data group management file for supervising one or plural data as the program-based data as a group of data that are to be reproduced in a preset order. The data group management file includes the pointer information indicating one or more database files associated with each data of the group of data to be supervised.

The controlling means of the data management apparatus according to the present invention causes the communication means to send the identification information of the first recording medium supervised by the database means to an external server to cause the supplementary information for the first recording medium in its entirety to be received from the external server to store the received supplementary information in the database means in association with the identification information. Alternatively, the controlling means causes the supplementary information for a fraction of programs recorded on the first recording medium to be received from the external server to store the received supplementary information in the database means in association with the identification information.

In the data management apparatus according to the present invention, the data recorded on dubbing from the first recording medium to the second recording medium are supervised by database means. The supplementary information can be obtained from the external server by supervising the identification information of the first recording medium. The so produced supplementary information is automatically registered in the database means to enable the supplementary information such as the name of the music air, to be obtained even in the absence of a user's input.

Other objects, features and advantages of the present invention will become more apparent from reading the embodiments of the present invention as shown in the drawings.

BRIEF DESCRIPTION OF THE DRAWINGS

FIGS. 6A and 6B show a sub-coding system of the CD system.

FIGS. 7A and 7B show sub-Q data of the CD system, where FIG. 7A shows sub-Q data in a lead-in area (TOC) and FIG. 7b shows sub-Q data of tracks #1 to #n and a lead-out area.

FIG. 8 shows a TOC structure of data with six tracks of the CD system.

FIGS. 11A and 11B show a music airplay order management file.

BEST MODE FOR CARRYING OUT THE INVENTION

As an embodiment of the data management device according to the present invention, a dubbing device which is adapted for automatically recording a program, such as music air data, also termed a track, reproduced from a CD, on a HDD, by dubbing, and which includes a function of supervising the dubbing data based on database management, is hereinafter explained.

Although a dubbing device and a personal computer are interconnected in the present embodiment to make up a data management device of the present invention, the present invention is not limited to this configuration.

Figure 1:
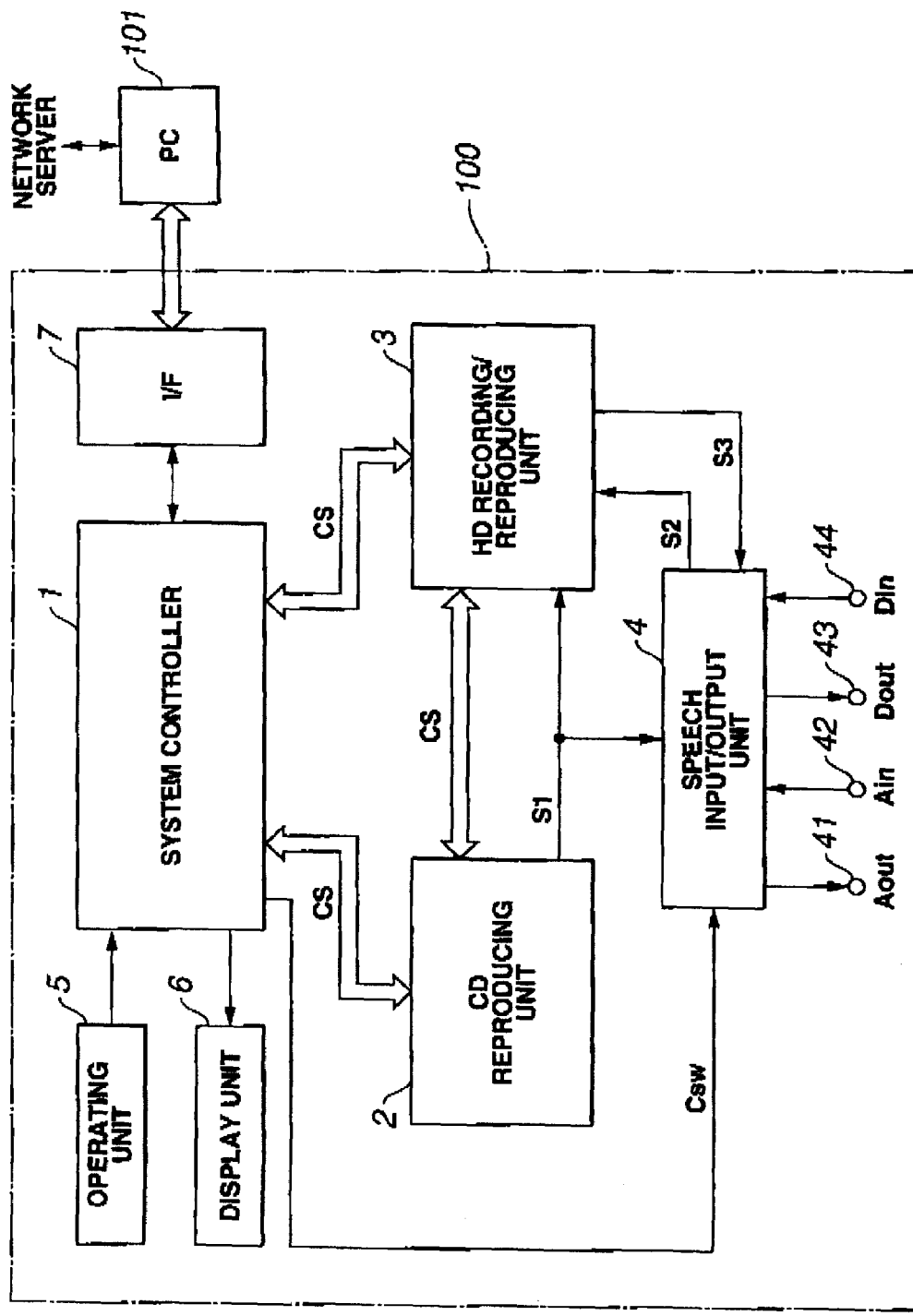
FIG. 1 is a block diagram showing a dubbing device making up a data management apparatus according to the present invention and a personal computer.

The embodiment of the present invention is explained in the following order:
1. Structure of a dubbing device
2. Structure of a CD reproducing unit
3. Structure of a HD recording and/or reproducing unit
4. Structure of a speech input/output unit
5. Sub-codes and TOC of a CD
6. File structure recorded in a HDD
7. Database
8. Dubbing operation
9. Operation of acquiring the supplementary information
10. Other embodiments 1. Structure of a Dubbing Device A dubbing device 100 according to the present invention is made up by a system controller 1, a CD reproducing unit 2, a HD recording and/or reproducing unit 3, a speech input/output unit 4, an operating unit 5, a display unit 6 and an interface 7, as shown in FIG. 1. This dubbing device 100 is connected to a personal computer 101 to form a data management device. In such case, the personal computer 101 mainly performs the role of communication means. In the dubbing device 100, the system controller 1, CD reproducing unit 2 and the HD recording and/or reproducing unit 3 are capable of exchanging various control signals CS with one another by, for example, an interconnecting bus structure. The system controller 1 sends control signals CS to the reproducing unit 2 and to the HD recording and/or reproducing unit 3 to cause the reproducing unit 2 and the HD recording and/or reproducing unit 3 to execute the respective required operations. The CD reproducing unit 2 and the HD recording and/or reproducing unit 3 transmit answer signals to the control signals CS, the information pertinent to the operating states (status), undermentioned sub-codes or TOC, and other necessary information, to the system controller 1.

The system controller 1 is formed by a micro-computer, and controls the overall operations based on the control signals CS supplied thereto. The system controller 1 is supplied with an input from the operating unit 5. The operating unit 5 is provided with for example a power supply key, an ejection key, a replay key, a pause key, a stop key, an air selection key or a recording key, and is acted on by a user. The system controller 1 is responsive to an actuation from the operating unit 5 to command operations to be executed by the CD reproducing unit 2 and the HD recording and/or reproducing unit 3 by the control signals CS. Among the operations, that can be executed, there may, for example, be an operation by a user specifying a CD track number to command reproduction of an optional music air, an operation by the user specifying the sequence of music air reproduction, by way of a so-called program reproduction, and an operation reproducing the music airs in a random sequence, by way of a so-called shuffle reproduction. An operator may also be provided which enables letters or characters to be input in order for the operator to input the supplementary information, such as title or name of the music air.

To the system controller 1 is connected the display unit 6, so that the system controller 1 is able to send display data to the display unit 6 to permit the display unit to execute the necessary display. For example, the time information, such as total playing time, time elapsed since the start of a music air being performed, the remnant play time of the music air being performed, or the overall remnant play time, or the track number of the music air being performed, is displayed on the display unit 6. In the case of a disc, having recorded thereon a disc name (album name) or a track name, the disc name or the track name is displayed.

The CD reproducing unit 2 is a site where a CD-DA as the first recording medium is loaded and reproduced. Although the detailed structure is to be explained subsequently in detail, audio data S1 (PCM digital audio data), reproduced from the CD, is sent to the speech input/output unit 4 and to the HD recording and/or reproducing unit 3.

It is noted that the CD reproducing unit 2 is capable of reproducing music data of the CD type disc, and is adapted to cope with the CD-DA, insofar as the present description is concerned. However, even if music data has been recorded on other CD type disc, for example, a CD-R or CD-RW, the CD reproducing unit is able to reproduce the music data in similar manner. There is also a disc, termed a CD text, as a type of the CD-DA, in which text data is recorded in the sub-code. In such case, the music data can be reproduced, while the text data can also be reproduced from the sub-code.

Although the first recording medium in the present embodiment is a CD, the first recording medium may also be other discs, such as MD, memory card, DATA (digital audio tape) or other mediums. In such case, it is sufficient that a reproducing unit for a CD, a memory card or a DATA (digital audio tape) may be provided in place of or in addition to the CD reproducing unit 2.

The recording and/or reproducing unit 3 is a site provided with a HDD as a large-capacity second recording medium for recording and/or reproducing data for the HDD. The HDD, as the second recording medium, has a capacity appreciably larger than that of the CD as the first recording medium, such as a capacity of tens of GB. To the recording and/or reproducing unit 3, the structure of which will be explained subsequently, audio data S1 from the CD reproducing unit 2 and audio data S2 from the speech input/output unit 4 (PCM digital audio data) can be input, so that the recording and/or reproducing unit 3 is able to record these audio data S1 and S2 on the HDD. The audio data S1 and S2 may, for example music data signals conforming to IEC60958. The audio data S3 reproduced from the HDD may also be output to the speech input/output unit 4.

The speech input/output unit 4 is a site for inputting/outputting audio data, and outputs audio data reproduced from the CD reproducing unit 2 or the HD recording and/or reproducing unit 3 to a loudspeaker system or to other equipment, while receiving audio data supplied from other equipment (digital audio data or analog audio signals). The system controller 1 also controls an input/output route, through the speech input/output unit 4, based on a changeover control signal CSW, as will be explained in detail subsequently.

The system controller 1 is connected over the interface 7 to the personal computer 101. For example, the personal computer 101 and the system controller 1 communicate with each other with clock asynchronous serial signals. The connection is by a serial cable or a USB cable routinely used on a computer. An application, operating on the personal computer 101, is able to control the system controller 1 to cause the dubbing device 100 to execute a required operation.

The personal computer 101 has a function of network communication, such as over the Internet, by a preset communication network, and is capable of communication with an external server, not shown. The external server here means an information site extending services of furnishing the supplementary information concerning the commercially available CDs. Specifically, the external server retrieves the relevant CD responsive to the CD identification information to furnish the supplementary information for the CD, for example, album name, name of the music airs recorded, or ISRC. The personal computer 101, communicating with such external server, is able to acquire the supplementary information. For executing the communication processing for acquiring the supplementary information, the personal computer 101 includes an application software for automatic acquisition of the supplementary information. As will be explained subsequently with reference to FIGS. 17 to 19, the operation of automatically acquiring the supplementary information, as an operation characteristic of the present embodiment, can be accomplished by concerted processing by the application software and the system controller 1.

The application software, operating on the personal computer 101, is able to display the CD music air information or the information recorded on the HDD, visually intelligibly, through use of GUI, to permit the user to edit the information on this application software. For example, GUI operations may be made on e.g., a monitor display, not shown, connected to the personal computer 101.

In the present embodiment, it is assumed that the personal computer 101 has the function as communication means and a portion of the function of control means for automatic acquisition of the supplementary information. It is however possible to provide a network communication unit in the dubbing device 100 and to enable the system controller 1 to perform communication operation control to render the connection between the system controller and the personal computer 101 redundant.

2. Structure of a CD Reproducing Unit

Figure 2:
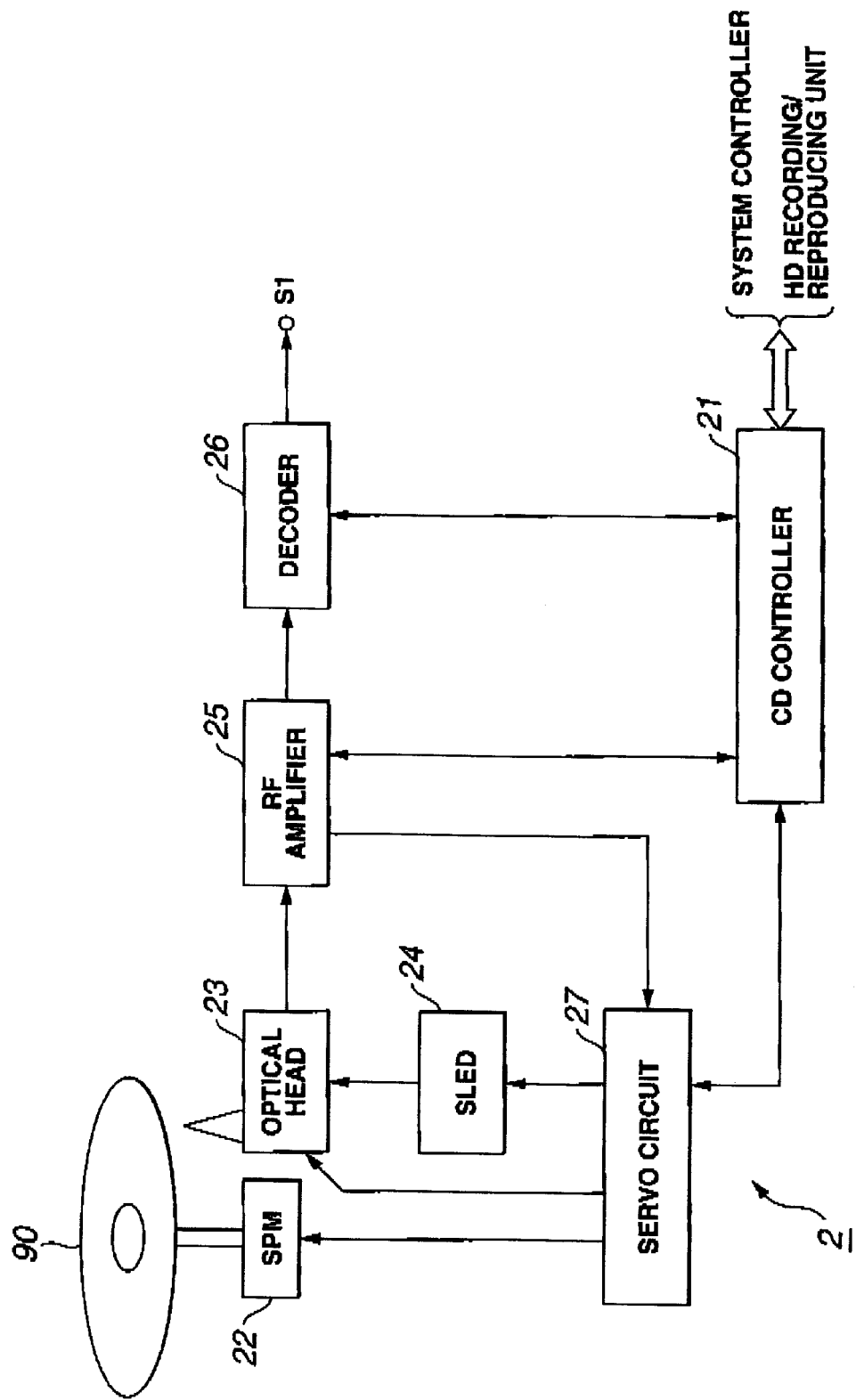
FIG. 2 is a block diagram showing a CD reproducing unit making up the data management apparatus according to the present invention.

The CD reproducing unit 2, used in the data management device of the present invention, has a structure shown in FIG. 2. A disc 90 is a CD loaded on the CD reproducing unit 2. During the CD reproducing operation, the disc 90 is rotationally driven at a constant linear velocity (CLV) by a spindle motor 22. By an optical head 23, data recorded in bits on the disc 90 are read out and supplied to an RF amplifier 25.

For reading out data from the disc 90, there are provided, in the optical head 23, a laser diode, as a laser light source, a photodetector for detecting the reflected light, an objective lens as an output end of the laser light, and an optical system for illuminating the laser light through an objective lens to a disc recording surface or routing the reflected light to the photodetector.

The objective lens is supported by a biaxial actuator for movement in the focussing direction parallel to the optical axis and in the tracking direction perpendicular to the optical axis. The optical head 23 in its entirety is supported by a sled mechanism 24 for movement along the radius of the optical disc.

The RF amplifier 25 generates focussing error signals and tracking error signals, in addition to the replay RF signals. These error signals are sent to a servo circuit 27. The servo circuit 27 generates focussing driving signals, tracking driving signals and sled driving signals, from the focussing and tracking error signals, to control the operation of the biaxial mechanism or the sled mechanism 24 in the optical head 23. The servo circuit 27 is responsive to low range components of the tracking error signals or to an access command signal from the CD controller 21 to generate sled driving signals to control the sled mechanism 24 to cause movement of the optical head 23. The servo circuit 27 also generates spindle driving signals, based on the spindle error signals or spindle kick/braking signals, supplied from the decoder 26 or from the CD controller 21, to control the movement of the spindle motor 22.

The reproduced RF signals, output from the RF amplifier 25, are sent to the decoder 26, which decoder 26 executes EFM demodulation and CIRC decoding to decode the information read out from the disc 90 into digital audio data S1, sampled with 44.1 kHz and quantized in 16 bits. The digital audio data are sent to the HD recording and/or reproducing unit 3 and to the speech input/output unit 4 shown in FIG. 1. The control data, such as TOC or sub-codes, extracted from the decoder 26, are supplied to the CD controller 21 for use in variegated control purposes.

The CD controller 21 is a micro-computer for controlling the CD reproducing unit 2. During reproduction of a disc 90 (CD), it is necessary to read out the management information recorded on the CD, that is the TOC. Based on this management information, the CD controller 21 finds the number of tracks recorded on the disc 90 or the address of each track to control the reproducing operation. Thus, when the disc 90 is loaded, the CD controller 21 reads out the TOC, by reproducing the innermost rim of the disc, where the TOC has been recorded, and causes the so read out TOC to be stored in the inner RAM, for reference at the time of the subsequent disc reproducing operation.

If the disc 90 is the CD text, text data are recorded in the sub-code forming the TOC data. In reading the TOC, the CD controller 21 reads in this text data, when reading in the TOC, to store the so read-in text data in an inner RAM. There is also a mode in which the text data is recorded not in the so-called TOC area, but in the sub-code in the program area. In such case, the text data is captured, along with the sub-code data, which is extracted as the reproduction of the program (track) proceeds.

The CD controller 21 is able to exchange various control signals CS with the system controller 1 or with the HD recording and/or reproducing unit 3 (HD controller 31 within the HD recording and/or reproducing unit 3 as later explained) as shown in FIG. 1. For example, when the operating unit 5 is acted on to initiate such operations as CD reproduction, fast feed (FF), rewind (REW), automatic index search (AMS), pause (transient stop), stop, or dubbing, the system controller 1 sends the operation information for these operations to the CD controller 21. Responsive to the operation information, the CD controller 21 controls the various portions of the CD reproducing unit 2 to execute the operations contemplated by the user. The CD controller 21 also sends the operating state of the CD reproducing unit 2, TOC information or the text information, read-in from the disc 90, or the time information (addresses) during CD replay, to the system controller 1. Based on the information from the CD controller 21, the system controller 1 is able to comprehend the operating state of the CD reproducing unit 2 and to cause the display unit 6 to demonstrate the aforementioned variegated display based on the TOC or the sub-code information.

The CD controller 21 exchanges variegated information between it and the HD recording and/or reproducing unit 3, at the time of the dubbing operation, as will be specifically explained later in detail.

3. Structure of a HD Recording and/or Reproducing Unit

Figure 3:
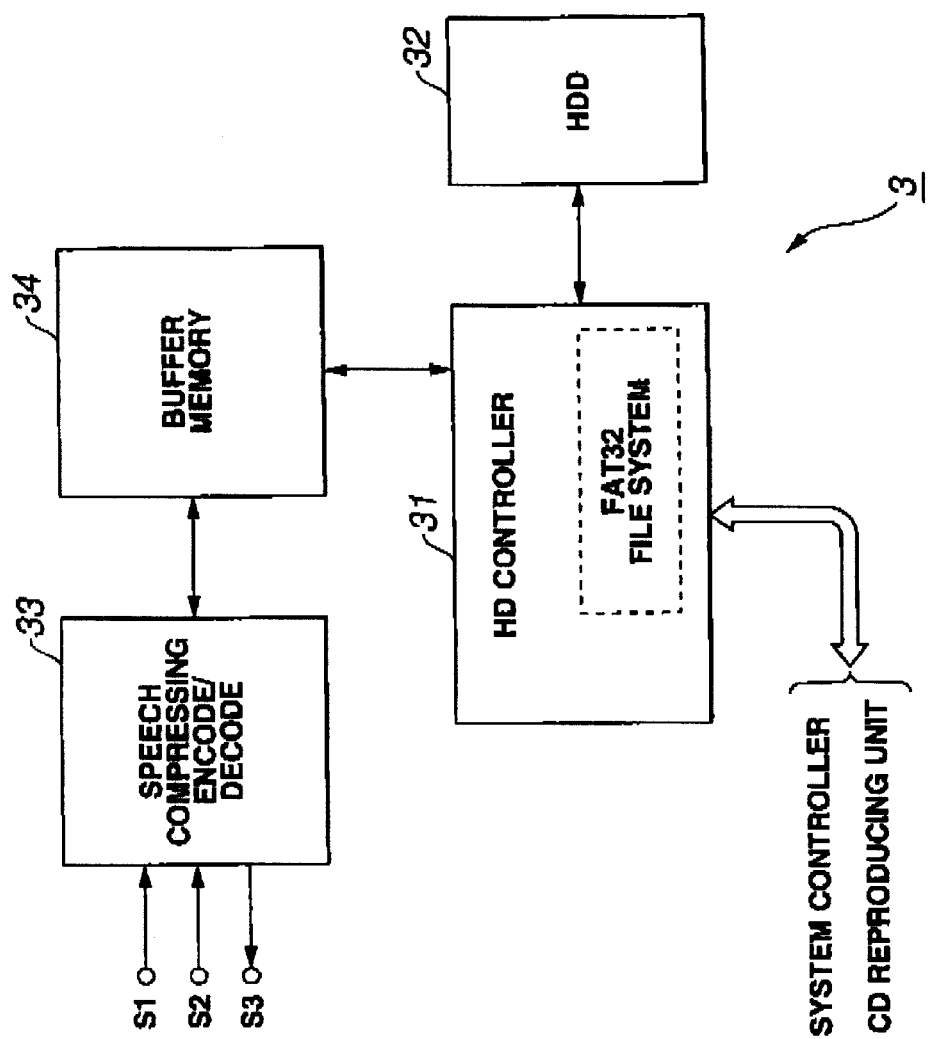
FIG. 3 is a block diagram showing an HD recording and/or reproducing unit making up the data management apparatus according to the present invention.

The HD recording and/or reproducing unit 3, forming the data management apparatus of the present invention, is configured as shown in FIG. 3. The HD recording and/or reproducing unit 3, shown in FIG. 3, includes a HDD (hard disc drive) 32, as a second recording medium of a larger capacity. A HD controller 31 is a controller for controlling the operation of the HD recording and/or reproducing unit 3. In the inside of the HD controller 31, there is loaded a mechanism termed a file system for achieving access, read-out and write for the HDD 32. This file system may, for example, be a FAT32 file system.

The HD controller 31 is able to exchange various control signals CS with the system controller 1 and with the CD reproducing unit 2 (CD controller 21), as shown in FIG. 1. When dubbing the replay data from the CD reproducing unit 2, as later explained, to the HDD 32, the system controller 1 issues dubbing and other commands to the HD controller 31. The CD controller 21 sends the TOC information or the text information as read in from the disc 90 being reproduced. The TOC information etc., is used for generating the disc identification information in a database as later explained. The HD controller 31 sends the information pertinent to the operating state (status) or the dubbing operation to the system controller 1 and to the CD controller 21.

The HDD 32 writes/reads out data under control by the HD controller 31. In particular, the digital audio data S1, reproduced by the CD reproducing unit 2, or the digital audio data S2, supplied from the speech input/output unit 4, are processed in a preset manner and are then recorded on the HDD 32. The recorded data are managed by the FAT 32 file system. The recorded data are read out by the HD controller 31 so as to be supplied to and output at the speech input/output unit 4. For example, if the user has performed an operation of specifying, for example, a music air recorded on the HDD 32, from the operating unit 5, for reproduction, the system controller 1 sends the operating information to the HD controller 31. The HD controller 31 then causes the data of the specified music air, for example, to be reproduced from the HDD 32, to send the so reproduced music air as audio data S3 to the speech input/output unit 4.

For supervising the data recorded on the HDD 32, a database for recording the CD identification information or the supplementary information concerning the CD is provided in the HDD 32. The HD controller 31 is able to reference and update the database stored in the HDD 32 as necessary.

A speech compression encoding/decoding circuit 33 and a buffer memory 34 are the sites for processing the recording data or the replay data of the HD 32. To the HD recording and/or reproducing unit 3, the digital audio data S1, reproduced by the CD reproducing unit 2, or the digital audio data S2, supplied from the speech input/output unit 4, are input. These digital audio data S1, S2, thus input, are compressed by the speech compression encoding/decoding circuit 33 by, for example, the ATRAC3 compression system. The digital audio data, thus compressed, are stored in the buffer memory 34 for recording on the HDD 32 under control by the HD controller 31. When reproduced from the HDD 32, the data read out from the HDD 32 by the HD controller 31 is stored in the buffer memory 34. The data is then read out at a preset rate from the buffer memory 34 so as to be expanded in the speech compression encoding/decoding circuit 33. This annuls the compression of the ATRAC3 system so that the data are output as ordinary digital audio data S3 at the speech input/output unit 4.

It should be noted that the compression system does not have to be the ATRAC3 but may be other compression system, such as the MPEG audio system. Alternatively, the data may be recorded uncompressed on the HDD 32. The data recorded on the HDD 32 may be encrypted and the data so encrypted may be decrypted at the time of reproduction.

4. Structure of a Speech Input/Output Unit

Figure 4:
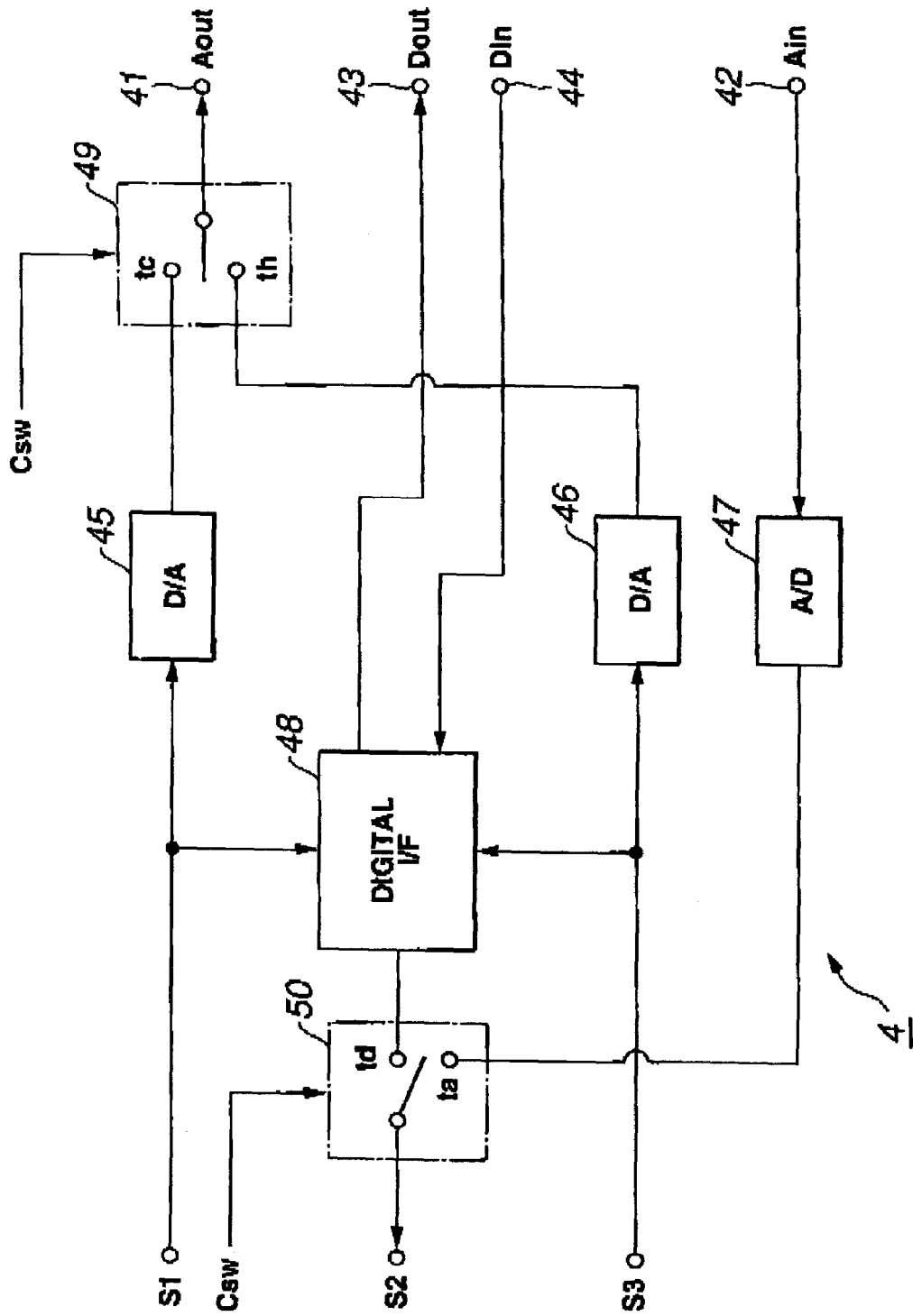
FIG. 4 is a block diagram showing a speech input/output unit.

The speech input/output unit 4, forming the data management apparatus according to the present invention, may be configured as shown in FIG. 4. The speech input/output unit 4, shown in FIG. 4, is provided with an output terminal 41 for analog audio signals, an input terminal 42 for analog audio signals, an output terminal 43 for the analog audio data, an input terminal 44 for the digital audio data, D/A converters 45, 46, an A/D converter 47, a digital interface 48, and switches 49, 50. To this speech input/output unit 4, the digital audio data S1, reproduced by the CD reproducing unit 2, or the digital audio data S3, reproduced by the HD recording and/or reproducing unit 3, are supplied.

During the time of reproduction in the CD reproducing unit 2, the system controller 1 causes the switch 49 to be connected to a tc terminal by the changeover control signal CSW. Consequently, the digital audio data S3 from the HD recording and/or reproducing unit 3 are converted by the D/A converter 46 into analog audio signals, which are supplied through switch 49 to the output terminal 41 so as to be output as analog audio signals. The analog audio signals from the output terminal 41 are amplified by a power amplifier circuit and output via a loudspeaker or sent to other equipment as a line output.

The digital audio data S1, reproduced by the CD reproducing unit 2, or the digital audio data S3, reproduced by the HD recording and/or reproducing unit 3, are also supplied to the digital interface 48. This digital interface 48 encodes the digital audio data S1 or S3, supplied thereto, in the transmission data configuration as the digital interface format, and outputs the resulting encoded data at the output terminal 43. That is, the reproduced speech can be transmitted to other equipment in a digital audio data configuration.

The HD recording and/or reproducing unit 3 is able to record not only the digital audio data S1 from the CD reproducing unit 2, but also the digital audio data S2 supplied from the speech input/output unit 4, on the HDD 32. To this end, the speech input/output unit 4 outputs the digital audio data S2 as follows:

First, if the analog audio signals from an external equipment is input to the input terminal 42, the analog audio signals are converted by the A/D converter 47 into digital audio data with the sampling frequency of 44.1 kHz and with the number of quantization bits of 16. The system controller 1 then causes a movable terminal of the switch 50 to be connected by the changeover control signal CSW to terminal ta, so that an output of the A/D converter 47 is sent as digital audio data S2 to the HD recording and/or reproducing unit 3. When digital audio data from the external equipment is input to the input terminal 44, the input data is decoded by the digital interface 48. At this time, the system controller 1 causes the movable terminal of the switch 50 to be connected by the changeover control signal CSW to terminal td. Consequently, an output decoded by the digital interface is sent as the digital audio data S2 to the HD recording and/or reproducing unit 3. It is also possible to supply the digital audio data S1, reproduced by the CD reproducing unit 2, to the HD recording and/or reproducing unit 3 as the digital audio data S2 through the digital interface 48.

5. Sub-codes and TOC of a CD

The sub-code recorded along with main data on the disc of the CD format, and the TOC, recorded in its lead-in area, are hereinafter explained.

The minimum unit of data, recorded on the CD type disc, is a frame, with 98 such frames making up one block.

Figure 5:
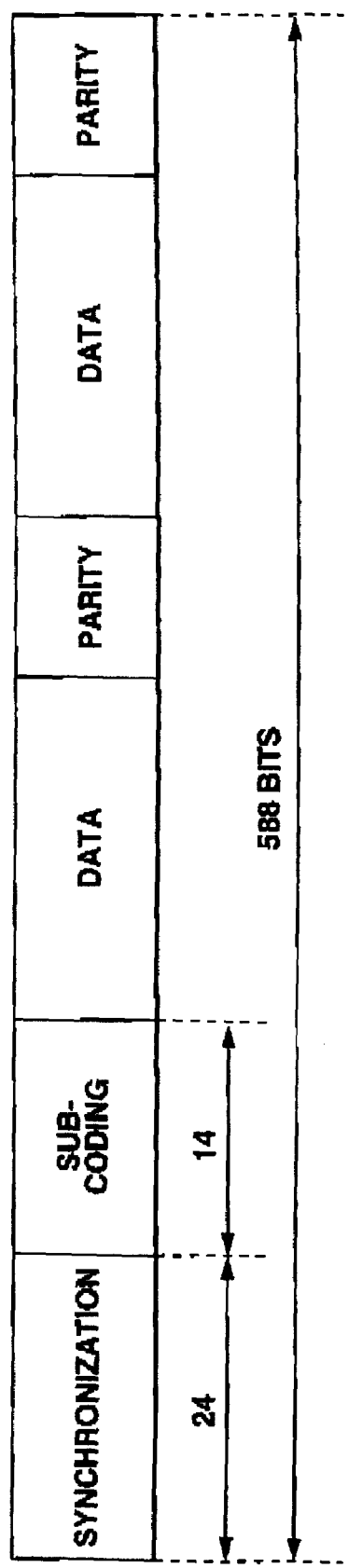
FIG. 5 shows a frame structure of the CD system.

FIG. 5 shows the structure of one frame.

One frame is made up by 588 bits, of which leading 24 bits represent synchronization data and the next following 14 bits represent a sub-code data area, which is followed by data and parities. 98 such frames make up one block. The sub-code data taken out from these 98 frames are collected to form one block of the sub-code data shown in FIG. 6A (sub-coding frame). The sub-code data from the first and second frames (frame 98n+1 and frame 98n+2) of the 98 frames are used as synchronization pattern. The third frame up to the number 98 frame (frame 98n+3 up to frame 98n+98) make up sub-code data (channel data) of channels P, Q, R, S, T, U, V and W, each being made up of 96 bits. Of these, the P and Q channels are used for e.g., access management. It should be noted that the P channel represents a pause portion between neighboring tracks such that finer control is taken charge of by the Q-channel (Q1 to Q96). The 96 bit Q-channel data are constructed as shown in FIG. 6B.

First, four bits of Q1 to Q4 are used as control data, that is for discriminating the number of audio channels, emphasis, CD-ROM, or whether or not digital copying is possible.

The four bits of Q5 to Q8 serve as ADR for indicating the sub-Q data mode.

Specifically, the four bits of ADR express the following modes (contents of the sub-Q data):

0000: mode 0 . . . basically the sub-Q data are all zero (used in a CD-RW)
0001: mode 1 . . . ordinary mode
0010: mode 2 . . . denotes a disc catalog number
0011: mode 3 . . . denotes e.g., ISRC (International Standard Recording Code)
0100: mode 4 . . . used in a CD-V
0101: mode 5 . . . used in a multi-session type medium, such as CD-R, CD-RW or CD-EXTRA The 72 bits of Q9 to Q80, next following the ADR, are used as sub-Q data, while the remaining bits Q81 to Q96 are used as CRC.

It is when the ADR indicates the mode 1 that the address is expressed by the sub-Q data.

The sub-Q data and the TOC structure for the case of ADR=mode 1 are explained with reference to FIGS. 7 and 8.

In the disc lead-in area, the sub-Q data recorded therein is no other than the TOC information. That is, the 72 bit sub-Q data of from Q9 to Q80 in the Q-channel data read in from the lead-in area has the information as shown in FIG. 7A. Meanwhile, FIG. 7A shows the portion of the 72-bit sub-Q data of the structure of FIG. 6B in the lead-in area in more detail. The sub-Q data each has eight bits of data and represents the TOC information.

First, a track number (TNO) is recorded with eight bits of Q9 to Q16. In the lead-in area, the track number is fixed at [00].

A point (POINT) is depicted by eight bits of from Q17 to Q24.

The eight bits each of Q25 to Q32, Q33 to Q40 and Q41 to Q48 denote MIN (minute), SEC (second) and FRAME (frame), as elapsed time in a lead-in area, respectively.

Q49 to Q56 are set to "00000000".

The eight bits each of Q57 to Q64, Q65 to Q72 and Q73 to Q80 record PMIN, PSEC and PFRAME, respectively. The meanings of the PMIN, PSEC and PFRAME are determined by the POINT values.

If the POINT value is from "01" to "99", these POINT values denote the track numbers. As for the PMIN, PSEC and PFRAME, the start point of a track of a given track number (absolute tie address) is recorded as minutes (PMIN), seconds (PSEC) and frames (PFRAME).

If the POINT value is "A0", the track number of the first track is recorded in PMIN. The distinction of the specifications, such as those of the CD-DA (digital audio), CD-I or CD-ROM (XA specifications) is made depending on the PSEC value. If the POINT value is "A1", the track number of the last track is recorded in PMIN. If the POINT value is "A2", the start point of the lead-out area is indicated in the PMIN, PSEC and PFRAME as the absolute time address (minute (PMIN), second (PSEC) and frame (PFRAME)).

If a disc has for example six tracks (six programs or six music airs) recorded thereon, data are recorded as shown in FIG. 8 as the TOC by these sub-Q data. Since it is the TOC that is recorded, the track number TNO is all zero or "00" as shown. The block NO means the number of one-unit sub-Q data read-in as the as block data of 98 frames (sub-coding frame) described above. The same contents are written over three blocks for each TOC data. If the POINT is "01" to "06" as shown, start points of the first track #1 to the sixth track #6 are indicated as the PMIN, PSEC and PFRAME.

If the POINT is "A0", "01" is shown as the first track number in PMIN. The disc may be discriminated by the value of the PSEC which is "00" if the disc is a CD for usual audio. If the disc is the CD-ROM (XA specifications), PSEC="20". The track number of the last track is recorded in PMIN at "A1" of the POINT value, while the start point of the lead-out area is indicated in PMIN, PSEC and PFRAME at "A2" of the POINT value. In the blocks n+27 ff., the contents of the blocks n to n+26 are repeatedly recorded.

In the program area, where music airs etc are recorded as tracks #1 to #n, and in the lead-out area, the sub-Q data recorded there has the information shown in FIG. 7B. In this figure, the structure of FIG. 6B in the program area and in the lead-out area is shown in detail for the 72-bit sub-Q data portion.

In this case, the track number (TNO) is recorded as eight bits of from Q9 to Q16. In the tracks #1 to #n, the track number assumes any of values from "01" to "99". In the lead-out area, the track number is "AA". In the next eight bits of Q17 to Q24, the index is recorded. The index is the information for further sub-dividing the respective tracks.

The eight bits each of Q25 to Q32, Q33 to Q40 and Q41 to Q48 denote MIN (minutes), SEC (seconds) and FRAME (frames), as the elapsed time in one track (relative address).

Q49 to Q56 are set to "00000000".

The eight bits each of Q57 to Q64, Q65 to Q72 and Q73 to Q80, which are termed AMIN, ASEC and AFRAME, respectively, become minutes (AMIN), seconds (ASEC) and frames (AFRAME), as absolute addresses, respectively. The absolute addresses become addresses continuously allocated from the leading end of the first track (that is the leading end of the program area) to the lead-out area.

The above is the sub-codes and the TOC basically formed by these sub-codes. The sub-codes may further include the variegated information. For example, in a CD text, R to W of the sub-code data of P, Q, R, S, T, U, V and W are used for storage of the text information.

6. File Structure Recorded in a HDD

The various files recorded in the HDD 32 are hereinafter explained by referring to FIG. 9.

The data, such as music data, input as the digital audio data S1, S2, to the HD recording and/or reproducing unit 3, as described above, and recorded in the HDD 32, are recorded as one music data file MDF, on the track basis, that is on the music air basis. In FIG. 9, there are shown plural music data files MDF1, MDF2, . . . , each representing one music air.

Figure 12B:
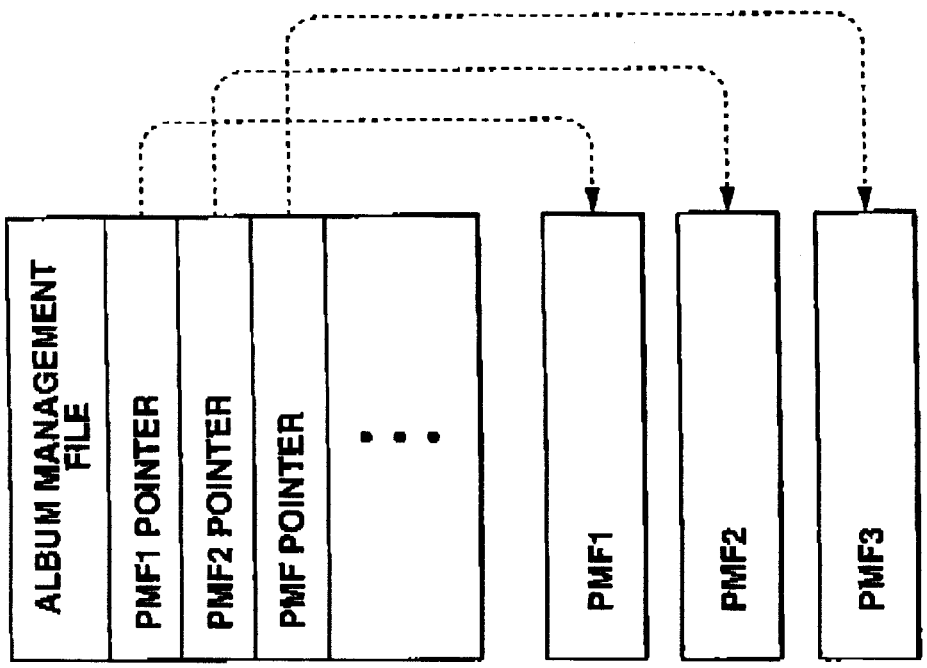
FIGS. 12A and 12B show the configuration of an album management file.
Figure 12A:
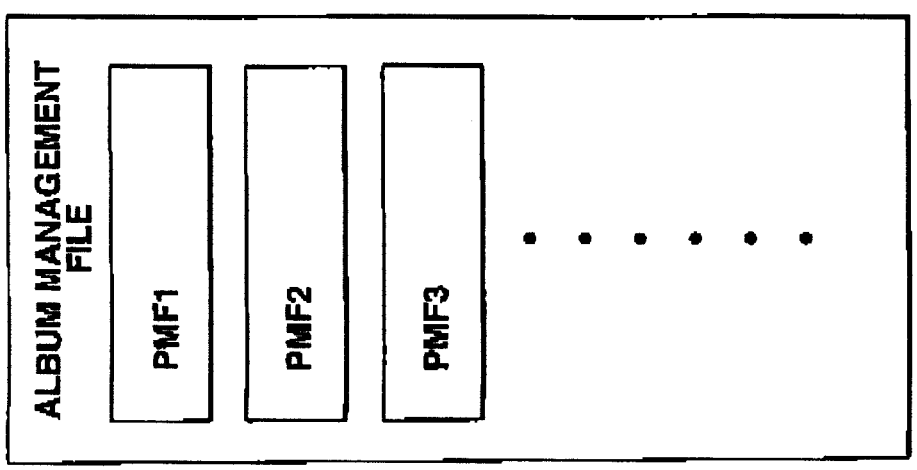

There is provided a music air play order management file PFM for individual music data files MDF, arranged as one data set, that is as a sole album. FIG. 9 shows plural music air play order management files PFM PFM1, PFM2, . . . each of which supervises a sole album. These play order management files PFM are supervised in their entirety as an album management file. While the configurations of the album management files and the respective play order management files PFM may be broadly variable, the respective play order management files PFM PFM1, PFM2, . . . may be formed as blocks in one album management file, as shown for example in FIG. 12A, or a pointer for each play order management file PFM, that is a recording position or a filename on the HDD 32, may be managed by the album management file, with each of the play order management files PFM PFM1, PFM2, . . . then being indicated by the associated pointer, as shown in FIG. 12B.

Figure 9:
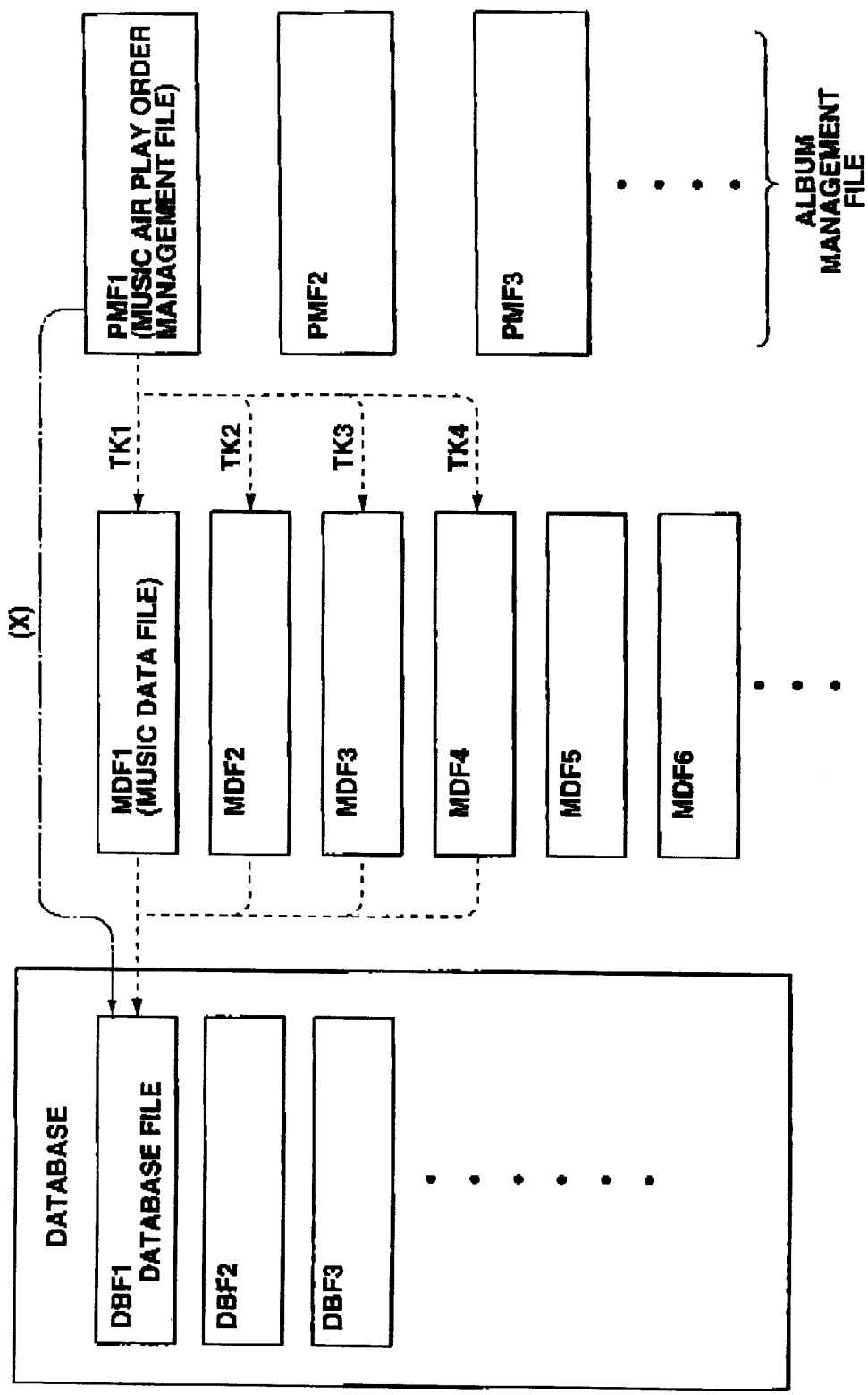
FIG. 9 shows a file structure of the HDD.

For example, if, in FIG. 9, the music data files MDF1 to MDF4 are tracks recorded by dubbing from a sole CD album, containing four music airs, the play order management file PFM1 is designed to manage these music data files MDF1 to MDF4 as tracks TK1 to TK4, making up a sole album, respectively. Meanwhile, this management as an album is performed not only when the CD album in its entirety is recorded by dubbing, but also when the plural music airs arbitrarily selected by the user and recorded on the HDD 32 are specified by the play order management file PFM for management as an album. That is, a user is able to construct an optional arbitrary number of music data files MDF in an arbitrary play order as an album. It is also possible for plural play order management files PFM to supervise a sole music data file in redundancy. That is, a given music air may be supervised in each of plural albums as being a sole music air constituting an album.

In the HDD 32, the database is constructed in the manner as described above. This database supervises e.g., the supplementary information for the music data file MDF with a database file DBF as a sole unit. The sole database file DBF is formed in association with a sole CD album. Each music data file MDF has a pointer specifying the database file DBF associated therewith. For example, if the music data files MDF1 to MDF4 are tracks recorded by dubbing from a sole CD album containing four music airs, a database file DBF1, associated with the CD album as the source of recording by dubbing, is formed in the database. The music data files MDF1 to MDF4 are associated with the database file DBF1, as shown in FIG. 9.

Figure 10:
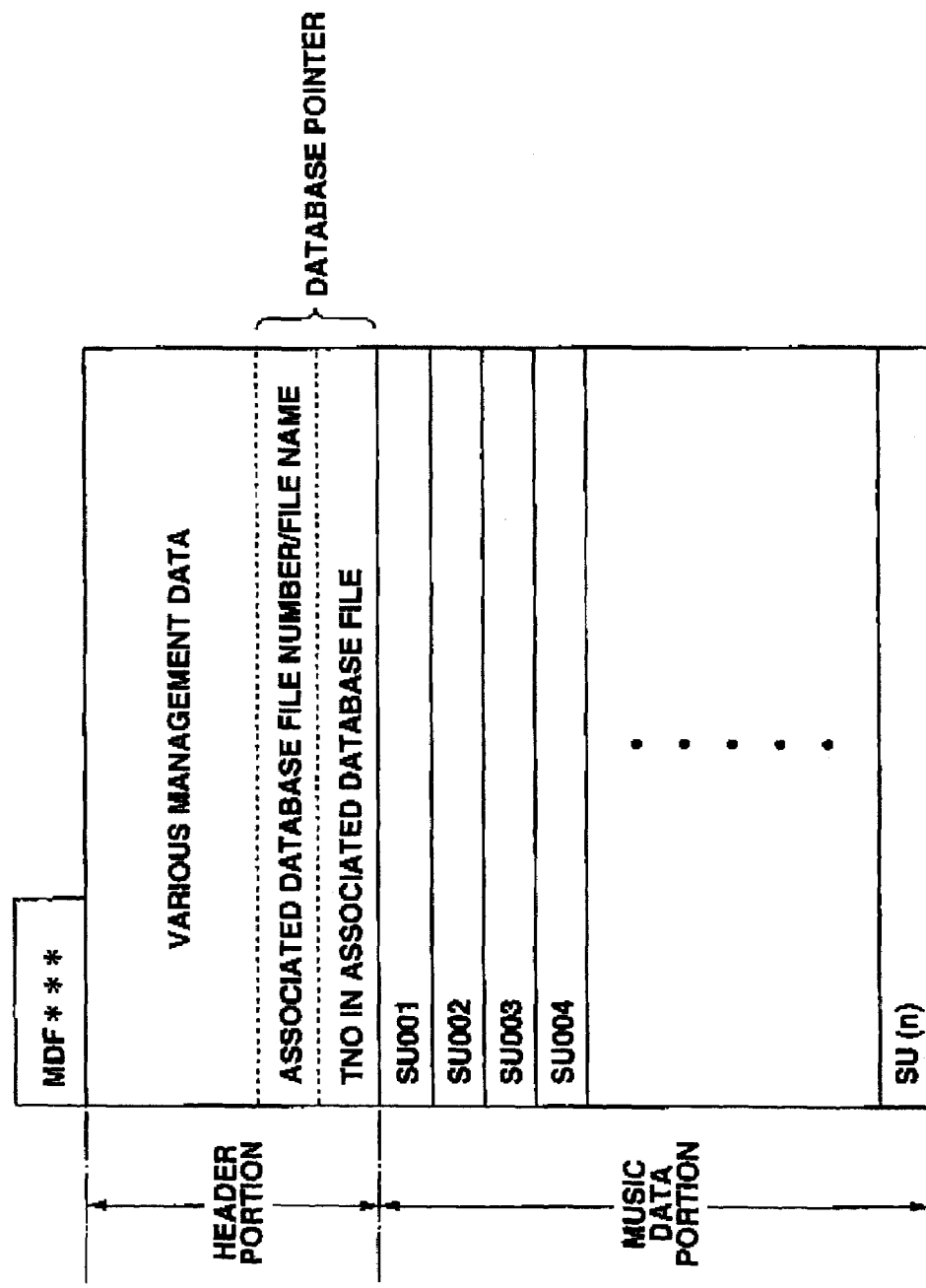
FIG. 10 shows a music data file.

FIG. 10 shows the structure of the music data file MDF.

The sole music data file MDF, bearing a filename "MDF***", is roughly made up by a header portion and a music data portion. In the header portion, there are recorded various attributes, file size (number of sound units) and other necessary management data of the music data file MDF. There are also recorded the database file number or the database file name, as pointers pointing to the sole database file DBF in the database associated with the music data file MDF, as described above. There are further recorded track numbers (TNO) indicating as which number track music air a music data file MDF in question is being supervised in the associated database file DBF. Since the data base file is formed on the basis of the TOC of the CD, the track number corresponds to the track number originally recorded in the CD album, but is not necessarily coincident with the track number supervised in the music air order play order management file, which will be explained subsequently.

In the music data portion, actual audio data is recorded. The audio data itself is a set of units termed sound units SU, with each sound unit being approximately 23 msec long. The audio data of one music air is formed by sound units (SU001) to (SU(n)).

FIGS. 11A and 11B show an exemplary structure of a music air play order management file PFM.

As shown in FIG. 11A, the music air play order management file PFM, to which is accorded a filename "PMF***", is made up roughly by a header portion and a music air order management portion. In the header portion, there are recorded an album number and other various management data.

The music air order management portion supervises the plural music data files MDF, managed as album by the music air play order management file PFM, as tracks TK#1 to TK#m of a preset sequence, that is as a music air play order. Specifically, the filenames of the plural music data files MDF, making up an album, are expressed as the tracks TK#1 to TK#m, as shown. For example, if the music air play order management file PFM 1 supervises these music data files MDF MDF1, MDF2, MDF3 and MDF4 as the tracks TK1, TK2, TK3 and TK4, making up a sole album, as shown in FIG. 9, the filenames of the music data files MDF MDF1, MDF2, MDF3 and MDF4 are sequentially recorded in the music air order management portion.

FIG. 11B shows a modification of the music air play order management file PFM in which a pointer of the database file DBF is recorded in the header portion in addition to the information of FIG. 11A. As already explained with reference to FIG. 9, the music air play order management file PFM supervises each music data file MDF, forming an album, while each music data file MDF points to an associated database file DBF. Although the explanation of the present embodiment is premised on this structure, it is also possible for the music data file MDF it supervises to point to the associated database file DBF, as will be indicated in a modification X shown in FIG. 9. In such case, the associated database file numbers or database filenames are recorded, as shown in FIG. 11B.

Meanwhile, one database file and one music air play order file PFM are not necessarily in a one-to-one correspondence to each other. That is, one database file DBF is associated with one CD album, as a source of dubbing, and supervises the supplementary information etc of the CD album in its entirety or of recorded music airs thereof.

Responsive to dubbing from a CD, one database file DBF is formed for this CD. For example, if only one music air has been recorded by dubbing from a certain CD to the HDD 32, the database file DBF, formed in association with the so recorded music data file MDF, is formed in a configuration associated with the entire CD as the source of recording by dubbing. This will be explained subsequently with reference to FIG. 13.

On the other hand, the music air play order management file PFM supervises one or more music data files MDF, as music airs recorded on the HDD 32, as a sole album. Thus, if the entire music airs are recorded by dubbing from the CD album, and the music data files MDF for the entire music airs are to be supervised as a sole album in the music air play order management file PFM, the entire music airs supervised by the music air play order management file PFM, that is the music data file MDF, are associated with the common database file DBF, so that one database file DBF is referenced from the music air play order management file PFM. However, if the user selects and records music airs from a large number of CDs by dubbing and has the so recorded music airs supervised in the music air play order management file PFM as an album, the respective music airs supervised by the music air play order management file PFM are associated with respective different database files DBF, so that plural database files DBF are referenced from the music air play order management file PFM. In such case, the database file numbers of the filenames of FIG. 1B are indicated on the track basis.

7. Database

The database is constructed by a set of the individual database files DBF, as shown in FIG. 9. In the database file DBF, there are recorded the CD identification information, CD album and the supplementary information pertinent to a program (track) recorded therein.

Figure 13:
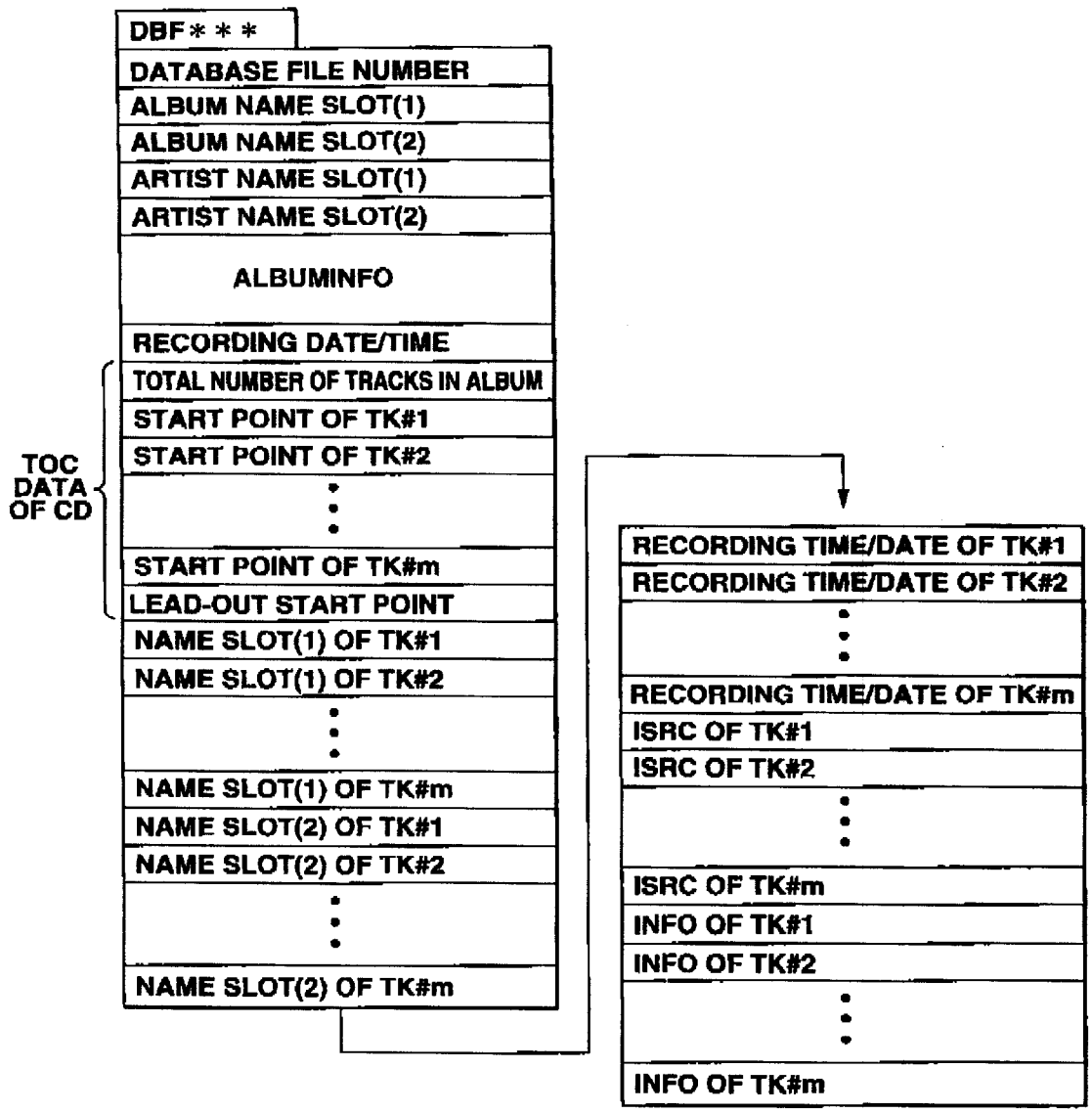
FIG. 13 shows a database file.

FIG. 13 shows the contents of one database file DBF.

As described above, one database file DBF is formed in association with one CD. The contents in the database file DBF, generated with a given database filename "DBF***", accorded thereto, are as follows:

Database file number

Thus database file number is a number accorded to each database file in a given database.

Album name slot (1)

It is an area in which to insert an album name of a one-byte letter or character.

Album name slot (2)

It is an area in which to insert an album name of a two-byte letter or character.

Artist name slot (1)

It is an area in which to insert an artist name of a one-byte letter or character.

Artist name slot (2)

It is an area in which to insert an artist name of a two-byte letter or character.

Album INFO

It is an area in which to insert the supplementary information associated with the entire album and which does not include the album name nor the artist's name. For example, the information such as the information pertinent to the album producer, producing company and the genre can be stored in this area. In addition, picture data, such as the album jacket picture, artist's picture or the image picture, may also be stored.

Recording date and time

It is an area in which to insert the information of the year, month, day, hour, minute and second of recording by dubbing on the HDD 32.

The information from the album name to the recording date and time as described above is the information supervised as the supplementary information associated with a certain CD album in its entirety.

Next, there is provided an area of the information obtained as TOC data of the CD.

Total number of tracks in an album

This is an area indicating the number of tracks, recorded in the CD, as indicated in the TOC data explained in FIGS. 7 and 8. Specifically, it is sufficient that the value of the last track number of the disc shown in FIG. 8 can be entered.

Start point of track TK#1 . . . start point of track TK#m

It indicates the start point of each track of the CD (address value with absolute time). For example, if the TOC data is as shown in FIG. 8, the value of the start point shown for each of the tracks #1 to #6 is directly recorded in this area of the data base file.

Start point of lead-out

It indicates the start point of lead-out of the CD (address value with the absolute time). For example, if the TOC data is as shown in FIG. 8, the value of the start point of the lead-out shown is directly recorded in this area of the database file.

The information from the total number of tracks to the lead-out start point as described above is the information which has substantially directly recorded the contents of the TOC data of the CD.

In the TOC data, in which the number of tracks contained in a CD, the absolute tine of start of a track (start point) and the lead-out start point are written in the form of minutes, seconds and frames, there is scarcely any possibility that all of these values become equal in different CDs. Consequently, these TOC data may prove the identification information of a CD of a particular title. In the present embodiment, this point is utilized to make the database file DBF the identification information of the associated CD.

The above-described external server, which extends services on the Internet, identifies a CD by the identification information employing the TOC information of the CD to furnish the supplementary information concerning the CD. Thus, in the present embodiment, as later explained, the identification information formed from the TOC data is transmitted when the supplementary information is requested to the external server.

Next to this identification information, there is formed an area for recording the supplementary information associated with each track recorded on the CD.

Name slot (1) of track TK#1 to name slot (1) of TK#m

This is an area in which to insert a name of a track for one-byte letter/character for each of the track TK#1 to the track TK#m.

Name slot (2) of track TK#1 to name slot (2) of TK#m

This is an area in which to insert a name of a track for two-byte letter/character for each of the track TK#1 to the track TK#m.

Recording date and time of track TK#1 to recording date and time of track TKI#m This is an area in which to insert the date and time of recording on the HDD 23 for each of the track TK#1 to the track TK#m.

ISRC of track TK#1 to ISRC of track TK#m

This is an area in which to insert ISRC data for each of track TK#1 to track TK#m.

INFO of track TK#1 to INFO of track TK#m

This is an area in which to insert the supplementary information other than the above-mentioned information for each of track TK#1 to track TK#m. For example, the information such as the genre, composer, conductor or the lyric of a music air or the picture data can be stored in this area.

Such database file DBF is generated responsive to the dubbing of the music data from the CD, or the information of the portion which proves the aforementioned identification information is recorded from the TOC data of the CD at such time point. However, in a majority of cases, not all information in the database file DBF is not recorded at a time point of recording by dubbing of the music data as the music data file MDF on the HDD 32. For example, with the HD controller 31, none of the album name, name of the music air, ISRC or the INFO is obtained at the time of dubbing from the CD, so that these are left as void (invalid data).

When the supplementary information, such as the name of the music air, is not supervised by the data base file DBF, the user is unable to recognize the music data file MDF, recorded on the HDD 32, with e.g., the name of the music number. In the present embodiment, such supplementary information is automatically captured from an external server for registration on the database file DBF, as will be explained subsequently. Meanwhile, if the disc 90 reproduced is the CD text, and if there is e.g., the name of the music air in the text data read out from the sub-code, the name of the music air can be registered in the database file at the time of dubbing in association with the track or disc. If the user optionally has entered e.g., the name of the music air, it can, of course, be registered as the supplementary information. In the present embodiment, however, such user input is made redundant by automatic registration processing.

8. Dubbing Operation

Figure 14:
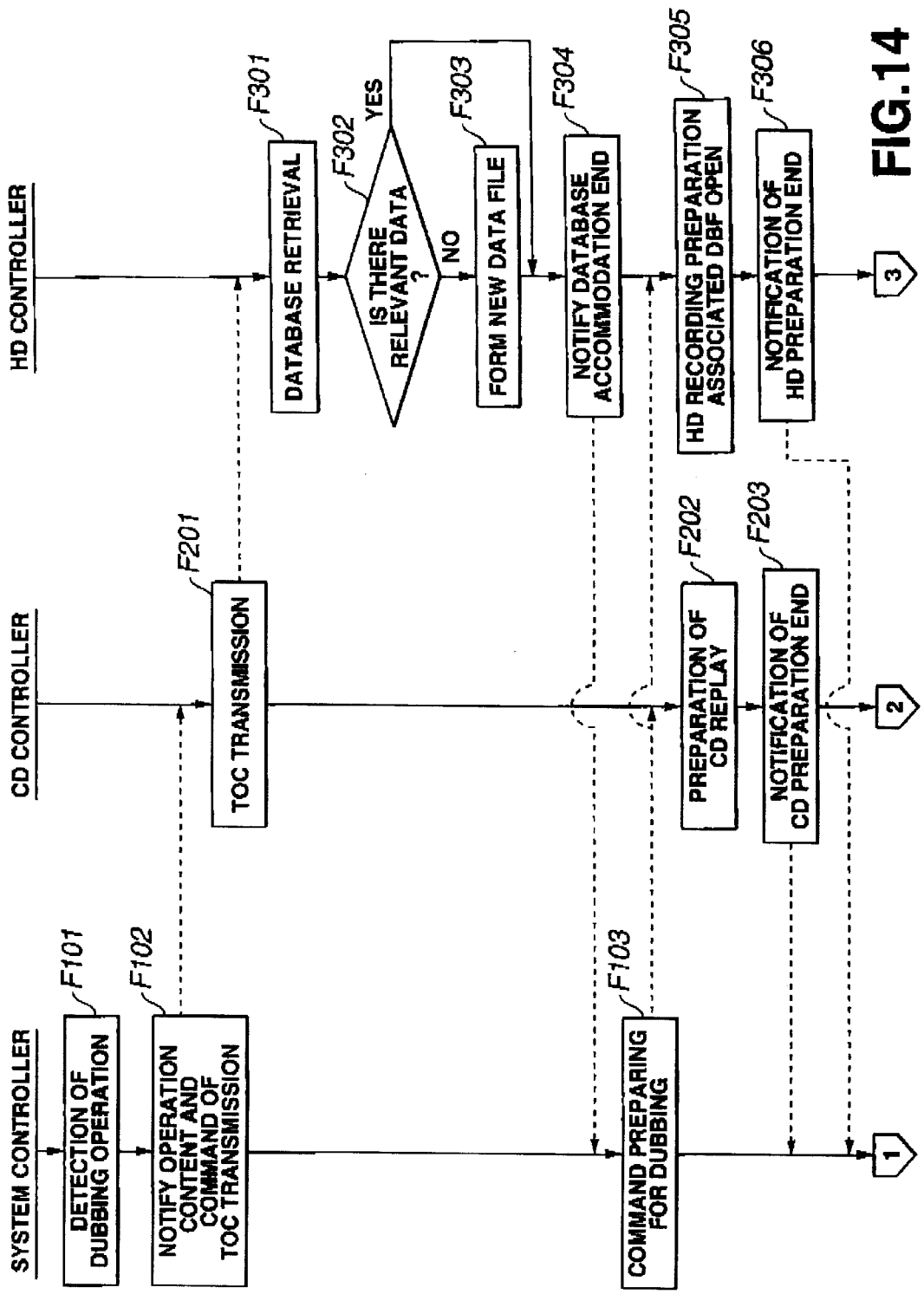
FIGS. 14 and 15 show a flowchart showing the processing sequence in dubbing.

The dubbing operation, performed in the dubbing device 100 under control by the system controller 1, CD controller 21 and by the HD controller 31, is explained with reference to FIGS. 14 and 15.

The system controller 1 at step F101 monitors whether or not the user performs an operation of acting on the operating unit 5 to issue a command for recording from the CD to the HDD 32. If the dubbing operation is made, the information as to the user operation is sent at step F102 to the CD reproducing unit 2 (CD controller 21). At the same time, the system controller 1 issues a command to transfer the TOC information of the disc 90, currently loaded on the CD reproducing unit 2, to the HD controller 31.

The operating information is the information as to which sort of dubbing has been commanded by the user, that is the information indicating whether the totality of music airs of a CD are to be recorded by dubbing, or one or more tracks is specified and only the track(s) so specified are to be recorded by dubbing.

When the notification of the information on the dubbing information and the command for TOC transfer are obtained from the system controller 1, the CD controller 21 at step F201 transfers the TOC data, already read-in for the currently loaded disc 90, to the HD controller 31, in accordance with the command issued by the system controller 1.

On receipt of the TOC data from the CD controller 21, the HD controller 31 at step F301 retrieves the database stored in the HDD 32. That is, the HD controller 31 generates the identification information, explained with reference to FIG. 13, from the contents of the input TOC data. Using the so generated identification information, the HD controller retrieves whether or not there is any of the database files DBF in the database having the same identification information recorded therein. The database file DBF having the same identification information is found when the recording by dubbing from the disc 90 currently loaded in the CD reproducing unit 2 was also made in the past and the database file DBF has already been produced for the disc 90. On the other hand, it is when the dubbing from the disc 90 currently loaded in the CD reproducing unit 2 is now made for the first time 90 that the database file DBF having the same identification information is not found.

If the result of retrieval indicates that no pertinent database file DBF has been found, the HD controller 31 proceeds from step F302 to step F303 where the database file DBF having the so prepared identification information accorded thereto is newly prepared and added to the database. The HD controller 31 then proceeds to step F304. If conversely the pertinent database file DBF has been found as the results of the retrieval, the HD controller 31 proceeds from step F302 to step F304. At this step F304, the fact that the database file DBF pertinent to the present dubbing is newly prepared or retrieved such that the preparation has been made on the database is notified to the system controller 1.

If, as the result of the retrieval, the pertinent database file has been found, it is probable that the totality of tracks newly recorded on the disc 90 have already been recorded as the music data file MDF on the HDD 32. Moreover, if the user has specified only certain tracks of the disc 90 for dubbing, it is probable that the tracks have already been recorded as the music data file MDF. In these cases, the dubbing operation, about to be performed, is unnecessary. Thus, although not shown in FIG. 14, a notification to the effect that no dubbing is necessary may be sent from the HD controller 31 to the system controller 1, in order to avoid redundant dubbing, the system controller 1 then displaying a message for the user on the display unit 6, in order to re-confirm the user's intention. Since the recording date and time on the HDD 32 of the track recorded on the CD has been recorded on the database file DBF, as described above, such that it can be grasped which track number music air of the CD (disc 90) has already been recorded as the music data file MDF on the HDD 32, the HD controller 31 may give a decision on whether or not the above dubbing is unnecessary by the HD controller 31 receiving the track number pertinent to the present dubbing from the system controller 1 or from the CD controller 21. Of course, the information indicating the recording or non-recording of each track on the HDD 32 may be recorded on the database file DBF.

On receipt of a database accommodation end notice from the HD controller 31, the system controller 1 at step F103 issues a command for making preparations for dubbing. That is, the CD controller 21 is commanded to make preparations for the dubbing as specified by the user, while the HD controller 31 is commanded to make preparations for recording. The CD controller 21 at step F202 is responsive to the command from the system controller 1 to make preparations for reproducing the disc 90. That is, by way of preparations for reproduction responsive to the user's actuation, preparations are made for reproducing the disc 90 in its entirety (that is the continuous reproduction from the first music air to the last music air) or the track(s) specified by the user. At a time point the preparations for reproduction are completed, a preparation end notice is sent at step F203 to the system controller 1.

The HD controller 31 at step F305 is responsive to the command from the system controller 1 to make preparations for reproduction of the disc 90. Specifically, the HD controller makes preparations for recording the digital audio data S1, reproduced by and supplied from the CD reproducing unit 2, on the HDD 32. At this time, the associated database file DBF is opened and the database filename for supervising the music air information of the disc 90, recorded by dubbing, is stored. Of course, this gives the database file DBF retrieved at step F301 or the database file DBF newly prepared at step F303. At a time point the preparations have been made for recording, the HD controller at step F306 sends a preparation end notice to the system controller 1.

Figure 15:
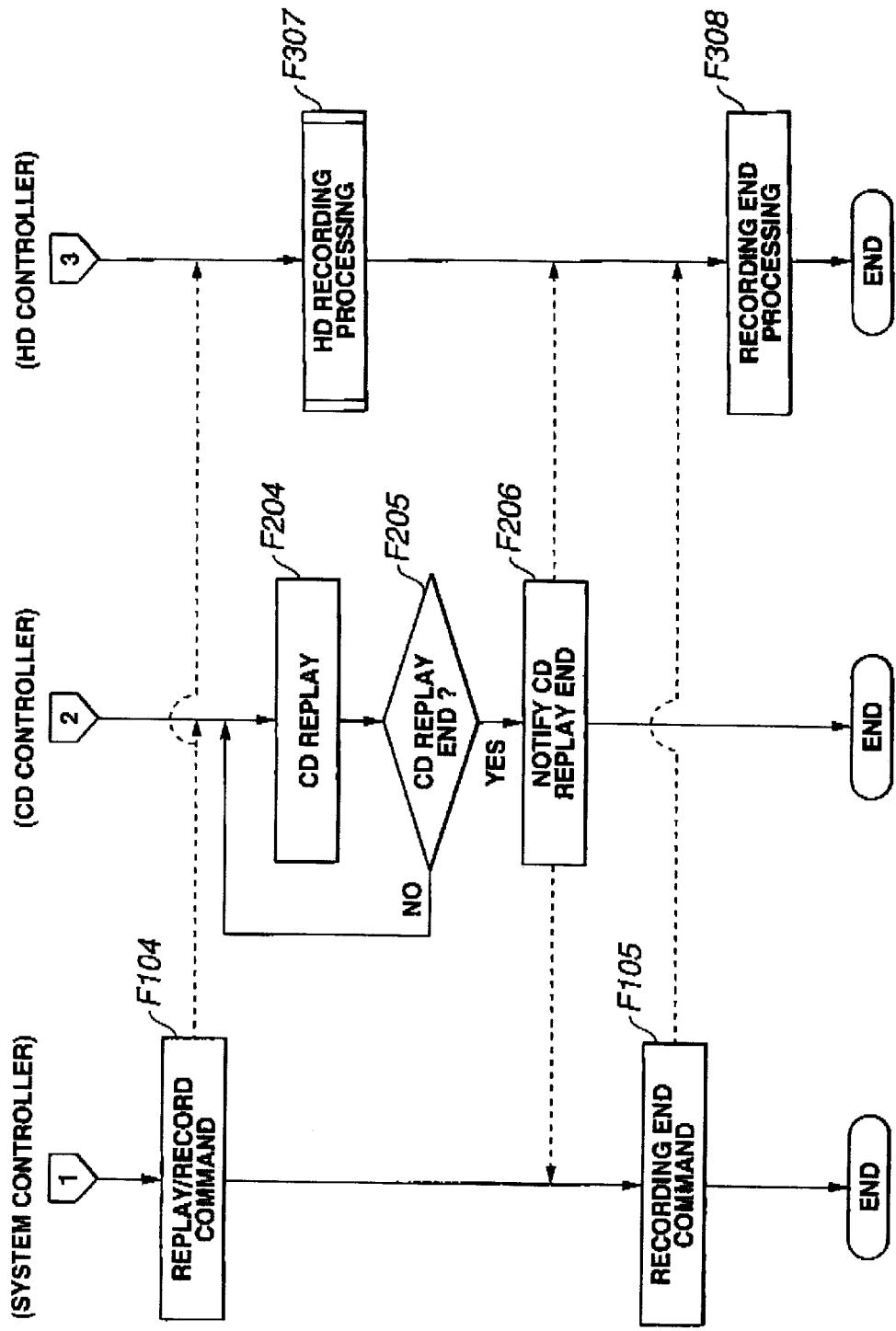

The processing performed by the respective portions then proceeds to the processing shown in FIG. 15.

On detection that the preparations at the CD reproducing unit 2 and the HD recording and/or reproducing unit 3 have been finished, the system controller 1 at step F104 commands the CD controller 21 to initiate the reproduction, while commanding the HD controller 31 to start the recording. The CD reproducing unit 2 is responsive thereto at step F204 to reproduce the disc 90 to send the reproduced digital audio data S1 to the recording and/or reproducing unit 3. The CD controller 21 executes the reproducing processing of step F204 until it is detected at step F205 that the reproduction of the disc 90 has been finished, that is that the reproduction of the totality of tracks has come to a close or the reproduction of one or more tracks specified by the user has come to a close.

The HD controller 31 is responsive to the command for starting the recording from the system controller 1 to execute at step F307 the recording processing for the HDD 32. That is, the HD controller performs preset processing on the digital audio data S1 supplied from the CD reproducing unit 2 to record the data as the music data file MDF on the sound unit basis.

Figure 16:
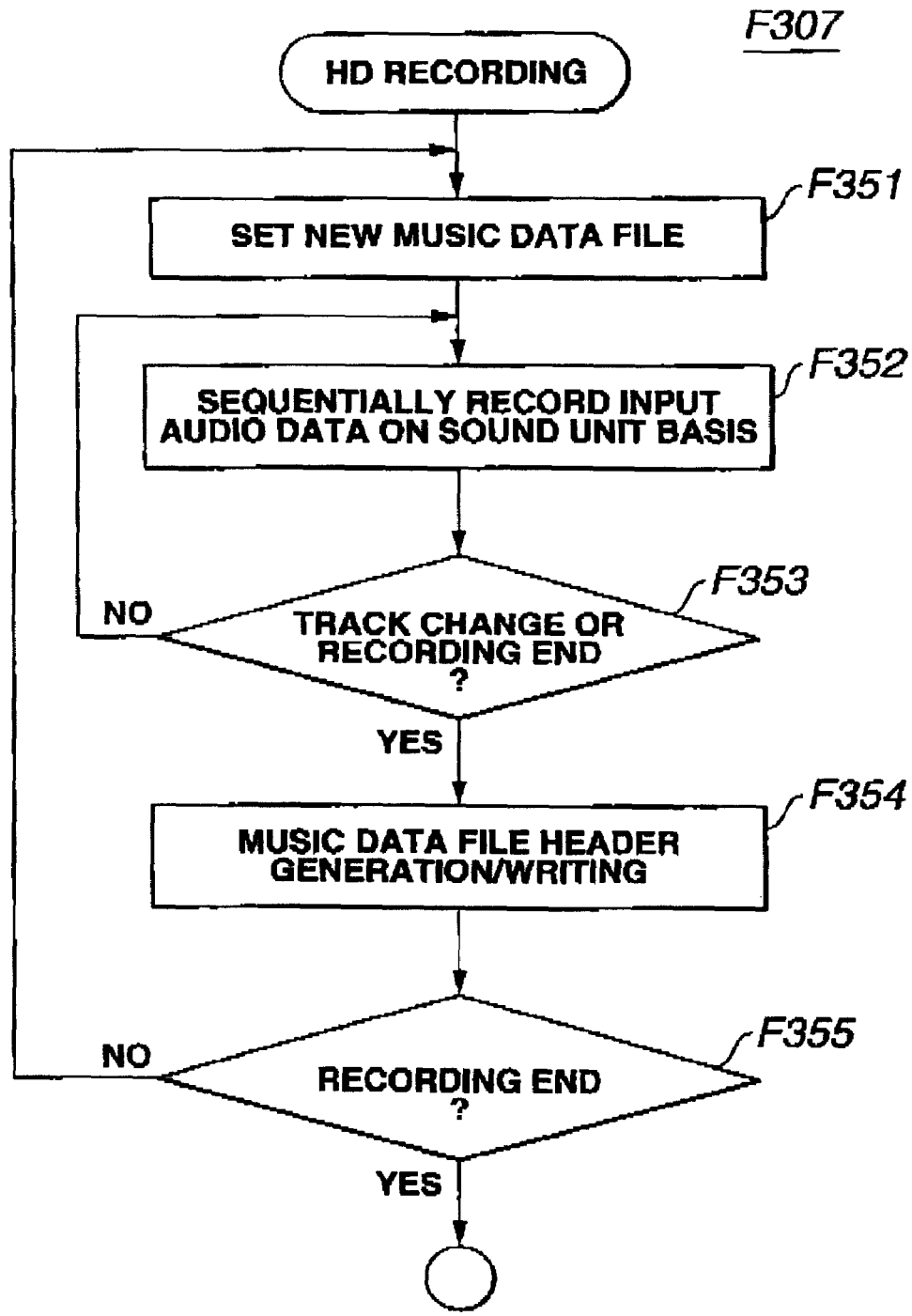
FIG. 16 is a flowchart showing the HD recording processing sequence in dubbing.

The recording processing at this step F307 is shown in detail in FIG. 16.

At a time point of start of the recording processing, the HD controller 31 at step F351 newly sets a music data file MDF. At step F352, the HD controller proceeds to perform preset processing, such as data compression, on the digital audio data S1, supplied thereto from the CD reproducing unit 2, to write the data in the music data file MDF from one sound unit SU to another, by way of performing the recording processing. During the time data is being written in the sole music data file MDF, the HD controller 31 is monitoring the track change or the command for recording end at step F353. On track change, that is when an air (track) reproduced by the CD reproducing unit 2 is changed from one air to the next, or when a command for end of the recording is issued from the system controller 1, the HD controller proceeds to step F354.

The variegated track change detection systems may roughly be classified into a system in which track change is monitored on the pair of the HD controller 31 and a system in which the CD controller 21 notifies a track change to the HD controller 31. For example, if the digital audio data S1 supplied to the HD recording and/or reproducing unit 3 is the digital data consistent with the IEC 60958 format, the HD controller 31 is able to detect the track change timing for the digital audio data S1, provided that the U bit track number continued in the digital data is monitored. Of course, the CD controller 21 is able to grasp the track change from the sub-ode obtained during the reproduction of the disc 90. Consequently, the HD controller 31 is able to grasp the track change timing of the input digital audio data S1 by sending a track change notice to the HD controller 31 in timed relation to the transmission timing of the digital audio data S1.

If a track change has been detected, the recording of the music data portion of the music data file MDF, in which the sound units SU (see FIG. 10) have so far been written, comes to a close at a time point the recording has been made for the digital audio data S1 for the track change point. Thus, the HD controller 31 at step F354 writes the information of the header portion for the music data file MDF to terminate the recording of the music data file MDF. Specifically, the various management data explained with reference to FIG. 10 are written as the header portion, while tile database file number, database filename and the track number on the database file, are written as pointers indicating the associated database file DBF. The database file number and the database filename respectively give the number and the filename indicating the database file DBF opened at step F305, while the track number gives the track number of the track on the disc 90.

Then, processing reverts from step F355 to step F351 to set a new music data file MDF for the next track and, at step F352, the digital audio data S1 is written in the music data file MDF, from one sound unit SU to another, by way of performing the processing of recording. By this processing, the music data file MDF is formed on the HDD 32 from one track of the disc 90 to another.

At a time point of completion of reproduction of the disc 90, the CD controller 21 sends the CD reproduction end notice to the system controller 1. This notice may also be sent to the HD controller 31. On detection of the CD reproduction end notice from the CD controller 21, the system controller 1 at step F105 commands a recording end to the HD controller 31. This HD controller 31 detects the command for recording end, in the processing of step F353 of FIG. 16, in which case the HD controller performs the same processing as that described above at step F354 to complete the music data file MDF for the last track, which was being recorded, after which the HD controller proceeds from step F355 to the recording end processing of step F308 of FIG. 15.

Examples of the recording end processing of step F308 include the setting of management states responsive to generation of one or more music data files MDF, such as essential processing, e.g., FAT updating or directory setting, or generation of a music air play order management file PFM used for supervising one or more incumbent music data files MDF as a sole album. In addition, the recordable information is written in the database file DBF. If the text 90 is e.g. a CD text, and the supplementary information, such as music air name information, has been acquired, data such as the album name or the music air name information may be written in the database file DBF. After the end of the above-described recording end processing, the sequence of processing operations in dubbing comes to a close.

In the foregoing, the dubbing operation has been explained as the processing in case the user has performed the operation of dubbing part or all of the tracks from the disc 90 as a sole disc. In actuality, there are occasions where the user selects his or her favorite music airs form plural CD to perform dubbing sequentially. In such case, the processing of FIGS. 14 and 15 is repeated from one CD to another.

9. Operation of Acquiring the Supplementary Information

By the above-described dubbing operation, the music data file MDF is formed on the HDD 32 on the track basis, whereas, in the database, there are present database files DBF associated with the respective music data files MDF. Moreover, the music data files MDF are supervised as an album by the music airplay order management file PFM. That is, the file structure explained in FIG. 9 is constructed. However, in the database file DBF, there is no supplementary information, such as the name of the music airs, recorded in the database file DBF.

In the present embodiment, the supplementary information is automatically registered in the database file DBF where no supplementary information has been recorded, by the processing now to be explained.

The operation of automatic supplementary information acquisition is carried out under the coordinated operations of the dubbing device 100 and the personal computer 101. This processing is explained with reference to FIGS. 17 to 19. In these figures, the processing of an application operating on the personal computer 101 and the processing on the part of the dubbing device, in particular the processing performed by the system controller 1 and the HD controller 31, is shown.

The application booted on the personal computer 101, referred to below as the PC application, has a function of presenting to the user the information pertinent to the music data file MDF recorded on the HDD 32, the function of coping with the GUI operations, the function of communication over a network, and the function of controlling the system controller 1. In the following description, the term "display" means a monitor display in the personal computer 101. As a modification, the display 6 of the dubbing device 100, for example, may be used. Although the user operation is carried out using a keyboard or a mouse on the part of the personal computer 101, the operating unit 5 may also be used, again as a modification.

The user may use the personal computer 101 to make a request for displaying the album information recorded on the HDD 32 as the information of a music data file MDF recorded on the HDD 32. On detecting an album information display request from the user at a step F401 shown in FIG. 17, the PC application at step F402 requests the album information from the dubbing device 100. For example, the PC application takes in a filename of the music air play order management file PFM present in the HDD 32 from the dubbing device 100, such as at booting, in order to grasp at least the number of the "albums" present in the HDD 32. The album name etc associated with each music air play order management file PFM is demonstrated on the display. Responsive to this demonstration, the user selects an optional album to make a request for more detailed information for the album. Thus, at step F402, the user requests the information pertinent to the album the user has selected (music air play order management file PFM).

The dubbing device 100 at step F501 confirms the contents of the music air play order management file PFM pertinent to the request from the PC application, and grasps each music data file MDF supervised by the music air play order management file PFM. Then, at step F502, the database file DBF associated with each music data file MDF is confirmed from the pointer of the database file recorded in each music data file MDF. Meanwhile, if, in this case, each music data file MDF managed by the music air play order management file PFM has been recorded by dubbing from the sole CD, the sole database file DBF is confirmed as the database file DBF associated with the music data files MDF. If each music data file MDF managed by the music air play order management file PFM has been selectively recorded by dubbing from two or more CDs to form a sole album, two or more database files DBF are con finned as the database file DBF associated with the music data files MDF.

At this time point when the associated database files DBF have been detected, the contents of the one or more database files DBF are confirmed to check whether or not the supplementary information, such as the name of the music airs, has been registered.

If the supplementary information, such as the name of the music airs, has not been registered for the totality of the music data files MDF of the music air play order management file PFM, that is the album, currently of interest, processing transfers from step F503 to step F504 to send the contents of the music air play order management file PFM as the album information to the PC application. In this case, the information such as the filename of the music data file MDF, supervised by the music air play order management file PFM, is transmitted to the personal computer 100. On the other-hand, if the supplementary information, such as the name of the music airs, has been registered for a fraction or the totality of the music data files MDF of the music air play order management file PFM, that is the album, currently of interest, processing transfers from step F503 to step F505 to send the contents of the music air play order management file PPM and the contents of the supplementary information registered in the associated database file DBF as the album information to the PC application. Thus, in this case, the information such as the filename of the music data file MDF, supervised by the music air play order management file PFM, is transmitted to the personal computer 100, whereas, as concerns the music data file MDF, the supplementary information of which has been registered, the supplementary information, such as the name of the music air, is also sent.

If the album information has been sent by the processing of step F504 or F505 by the dubbing device 100, the PC application at step F403 demonstrates the contents of the album information thus sent on the display. For example, the filenames of the music data file MDF, as the music airs contained in the album, the information of which has been requested by the user, are displayed as a list. In particular, if the supplementary information has been sent at step F505, the names of the music airs etc may be demonstrated in place of or along with the filenames. Of course, other items of the supplementary information can also be displayed.

As a matter of course, if the names of the music airs are displayed, the user is able to comprehend the music air contained in the album. For example, the user is able to select and reproduce the album or a desired music air(s) in the album, or to specify another album to request the album information. Such selection or reproduction is possible in the absence of the name of the music air displayed. However, if an extremely large number of the music data files MDF have been recorded in the HDD 32, it is difficult for the user to identify which music data file MDF denotes which music air. On the other hand, the album-based supplementary information is convenient for the user if such information is displayed, while such information is inconvenient for the user if it is not displayed. In this consideration, the PC application is designed to be able to request the processing of automatically registering such information for the album or the music data file MDF to which no album name nor the name of the music air has been accorded. In such case, the user able to selectively specify the processing of acquiring the supplementary information such as the album name or the name(s) of the music air(s) contained in the album on the album basis, or the processing of specifying a certain track in the album, or automatically selecting only the track for which no supplementary information has been registered, in order to acquire the supplementary information, such as the name of the music air for the track.

If the user has specified the album-based automatic acquisition of the supplementary information, the processing of the PC application proceeds from step F404 to step F405 and notifies the effect of performing the album-based automatic acquisition of the supplementary information to the dubbing device 100. The processing of the PC application then proceeds to the processing of FIG. 18. If the user has specified the track-based automatic acquisition of the supplementary information, the processing of the PC application proceeds from step F406 to step F407 and notifies the effect of performing the track-based automatic acquisition of the supplementary information to the dubbing device 100. The processing of the PC application then proceeds to the processing of FIG. 19. The dubbing device 100 is also responsive to the notice of the PC application at step F405 or F407 to proceed to the processing of FIG. 18 or to that of FIG. 19 in the case of the album-based automatic acquisition of the supplementary information or in the case of the track-based automatic acquisition of the supplementary information, respectively.

Meanwhile, if the user has made another processing by GUI operations in response to the demonstration on the display, the PC application proceeds from step F408 to another processing, that is processing which is in keeping with the processing performed. For example, if the user has commanded replay of an album or a track or addition or deletion of the music data file MDF contained in an album or change of the music air play sequence, by way of an album editing processing, or has performed an operation of extracting the music data file MDF recorded on the HDD 32 to form a new album, that is a music air play order management file PFM, processing which is in keeping with the processing performed is performed. This is not explained in detail since it does not directly have to do with the processing of automatically acquiring the supplementary information.

Figure 18:
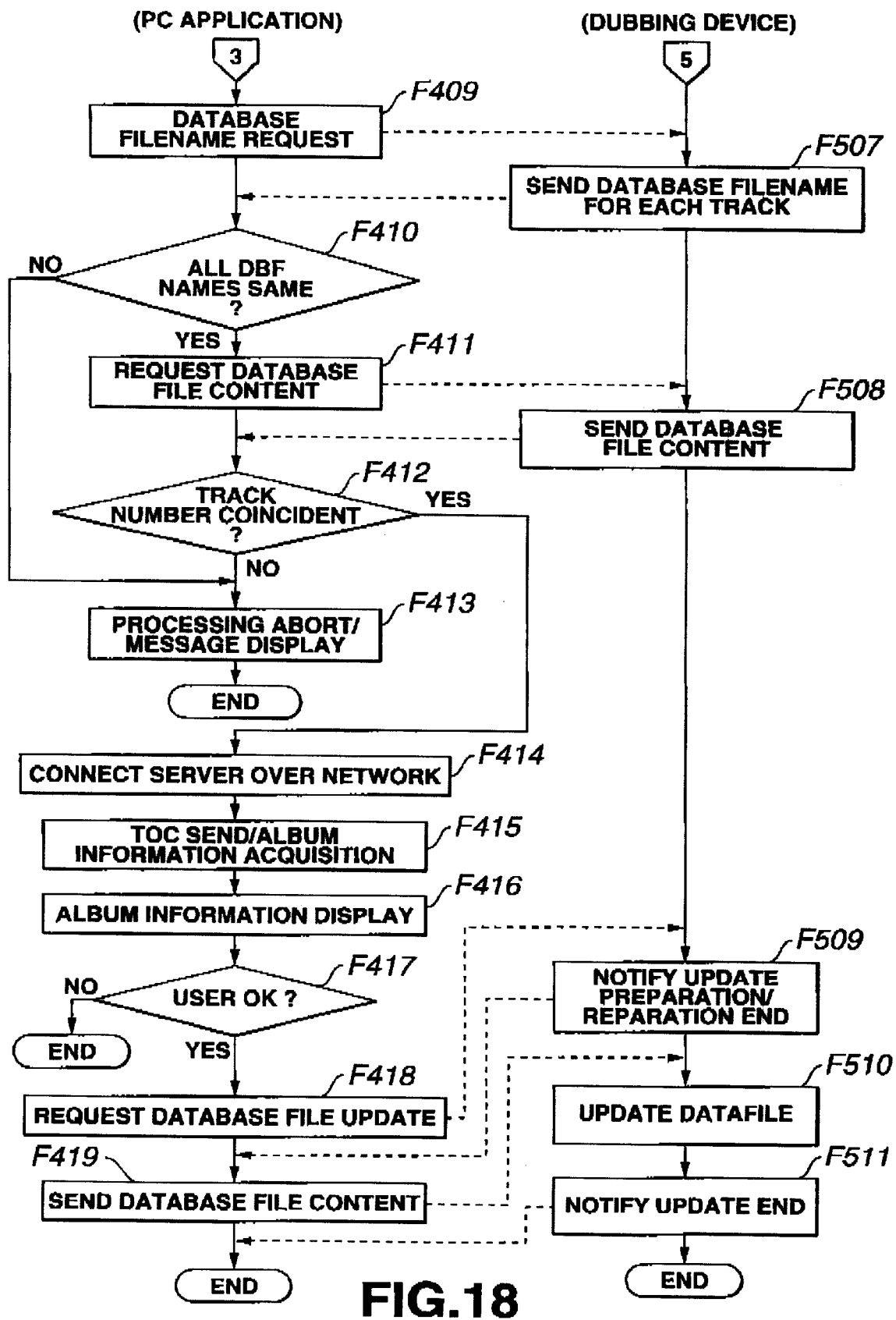

Referring to FIG. 18, the processing of the PC application and the dubbing device 100 in case the user has requested the album-based authentication acquisition of the supplementary information is now explained. In this case, the PC application first at step F409 requests a database filename, currently processed, to the dubbing device 100. The dubbing device 100 is responsive thereto to send at step F507 the database filename or the database file number recorded in each music data file MDF supervised in the current album (music air play order management file PFM) to the PC application.

On receipt of the database filename, associated with each music data file MDF, the PC application at step F410 checks whether or not the entire database filenames or database file numbers as transmitted coincide with one another. If the entire database filenames are not coincident, it indicates that the current album (music air play order management file PFM) is not supervising the music data files MDF recorded by dubbing from a sole CD. That is, the music air play order management file PFM is not supervising the album associated with a given sole CD. In such case, processing transfers to step F413 to abort the album-based automatic acquisition of the supplementary information, while demonstrating a message indicating that effect on the display, by way of intimation to the user, to terminate the processing.

If the entire database filenames are coincident at step F410, the PC application at step F411 requests the contents of the data of the database file DBF itself to the dubbing device 100. The dubbing device 100 is responsive thereto to send at step F508 the contents of the so requested database file DBF to the PC application. Although the contents of the database file DBF, sent to the PC application, may be the entire data, it may be sufficient to transmit at least the aforementioned identification information generated on the basis of the TOC data.

The PC application is able to grasp the number of tracks of the original CD album from the contents of the database file DBF. It is because the identification information contains the information pertinent to the total number of tracks in the album, as explained with reference to FIG. 13. The original number of the tracks of the CD is now compared to the number of tracks supervised by the current music air play order management file PFM (the number of music data files DFM) to check whether or not the two numbers of tracks coincide with each other. If the numbers of tracks coincide with each other, it may be that the entire tracks of a CD have been recorded by dubbing to the HDD 32 and the music air play order management file PFM is supervising the respective music data files MDF on the HDD 32 as a set of music airs of the same contents as the entire tracks recorded on the original CD. It should be noted that the order of the music airs may not be coincident depending on user's editing operations.

If conversely the numbers of tracks are not coincident with each other, it indicates that the music airs supervised by the music air play order management file PFM (music data file MDF) are music airs recorded in the same CD but are not the entire music airs recorded in the CD. In such case, it is determined that the original CD and the current album on the HDD 32 (music air play order management file PFM) are not entirely coincident with each other as to the music airs contained therein. Thus, the PC application proceeds to step F413 to abort the processing of album-based automatic acquisition of the supplementary information, while demonstrating a message indicating such effect on the display, by way of information for the user, to terminate the processing.

That is, in the illustrative processing shown in FIG. 18, the processing of album-based automatic acquisition of the supplementary information is carried out in case the music airs contained in the original CD and the music airs contained in the current album on the HDD 23 (music air play order management file PFM) are completely coincident with each other. For this reason, the processing of automatic acquisition of the supplementary information is initiated when the numbers of tracks are coincident at step F412. First, the PC application at step F414 causes the network connection at step F414 for establishing connection to a preset external server extending supplementary information supplying services. At step F415, the PC application sends the TOC data recorded on the database file DBF, that is the aforementioned identification information, and requests the supplementary information, such as album name or the name of the music air, pertinent to the CD indicated in the identification information. The external server discriminates a specified CD album, as a key for discriminating the TOC data, from a large number of commercially available CD albums, and sends the supplementary information for the specified CD album. On receipt of the supplementary information from the external server, the PC application demonstrates the so received information at step F416 on the display. For example, the actual album names or the names of the music air are displayed in place of or in addition to the album names or the names of the music air indicated as filenames on the HDD 32.

The user is informed in this manner of the contents of a given album stored in the HDD 32. In actuality, the user registers tie names etc in the database file DBF and subsequently operates for commanding whether or not the names etc are to be indicated by the registered names. Specifically, the PC application at step F417 causes a message to be demonstrated on the display for inquiring whether or not the supplementary information such as the names being demonstrated may be registered. The user replies to this inquiry. If the user decides that the registration is unnecessary, the processing is straightly terminated. If the user requests the registration, the PC application proceeds to step F418 to send a request for updating the database file DBF to the dubbing device 100. The dubbing device 100 is responsive thereto to make preparations for updating the database file DBF at step F509 to return a notification of the completion of the preparations at a time point of the end of the preparations. The PC application at step F419 sends the contents of the database file DBF, that is the supplementary information received from the external server, to the dubbing device 100. The dubbing device 100 at step F510 writes the supplementary information, sent thereto, in the database file DBF, by way of performing an update operation. On completion of the updating, the PC application at step F511 sends a notification of the end of the updating to the PC application to terminate the processing.

By the above-described processing, the supplementary information is automatically acquired from the external server on the album basis, and the supplementary information acquired in the relevant database file DBF is registered by way of the updating processing. For example, even if only the database file number, the identification information by the TOC data and the recording date and time, among the information shown in FIG. 13, have been recorded in the database file DBF at the time point prior to the above processing, the supplementary information is registered in each name slot, ISRC and INFO shown in FIG. 13, by the above processing.

Figure 17:
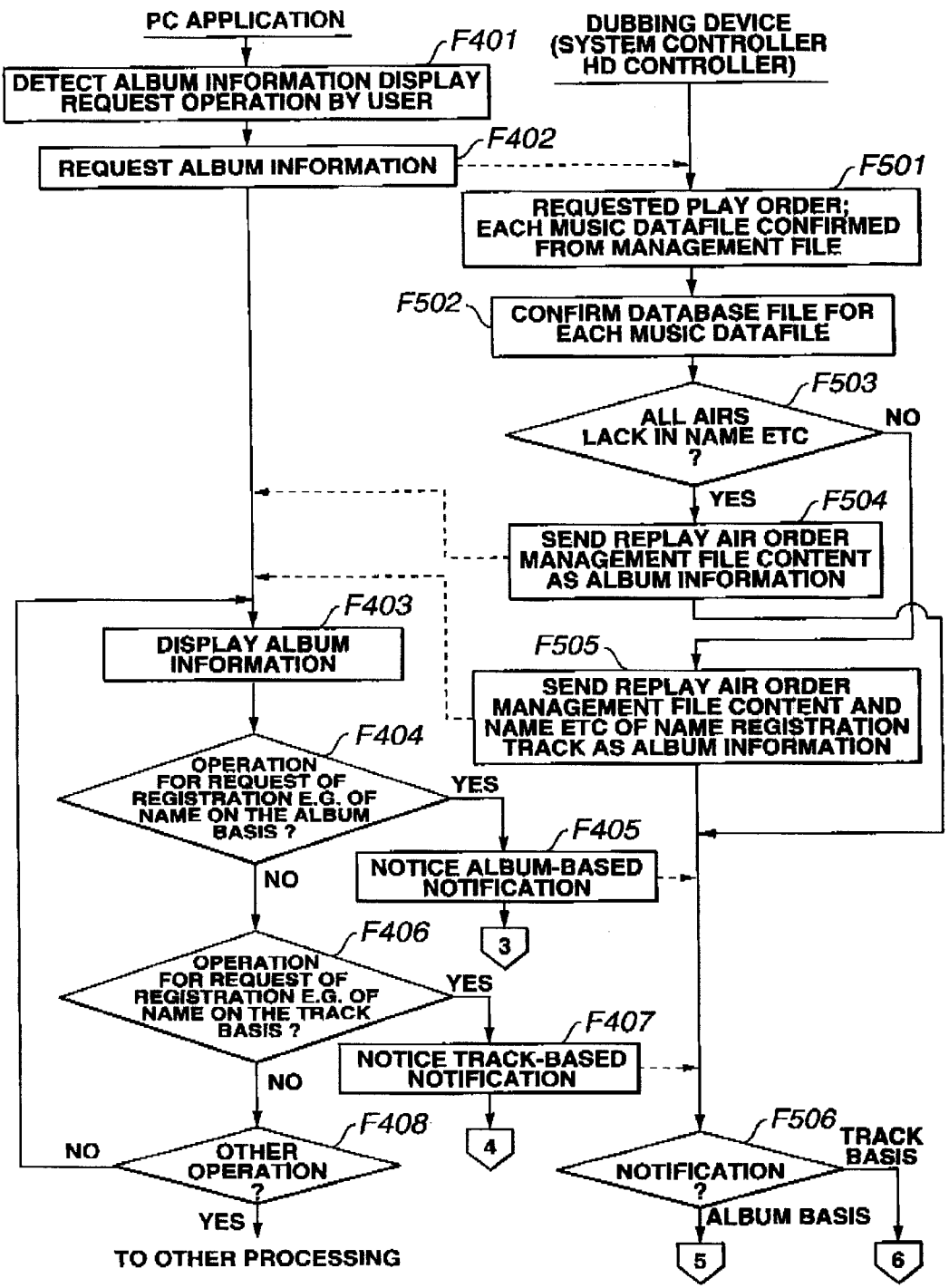
FIGS. 17 to 19 show flowcharts showing the processing sequence of automatic acquisition of the supplementary information.
Figure 19:
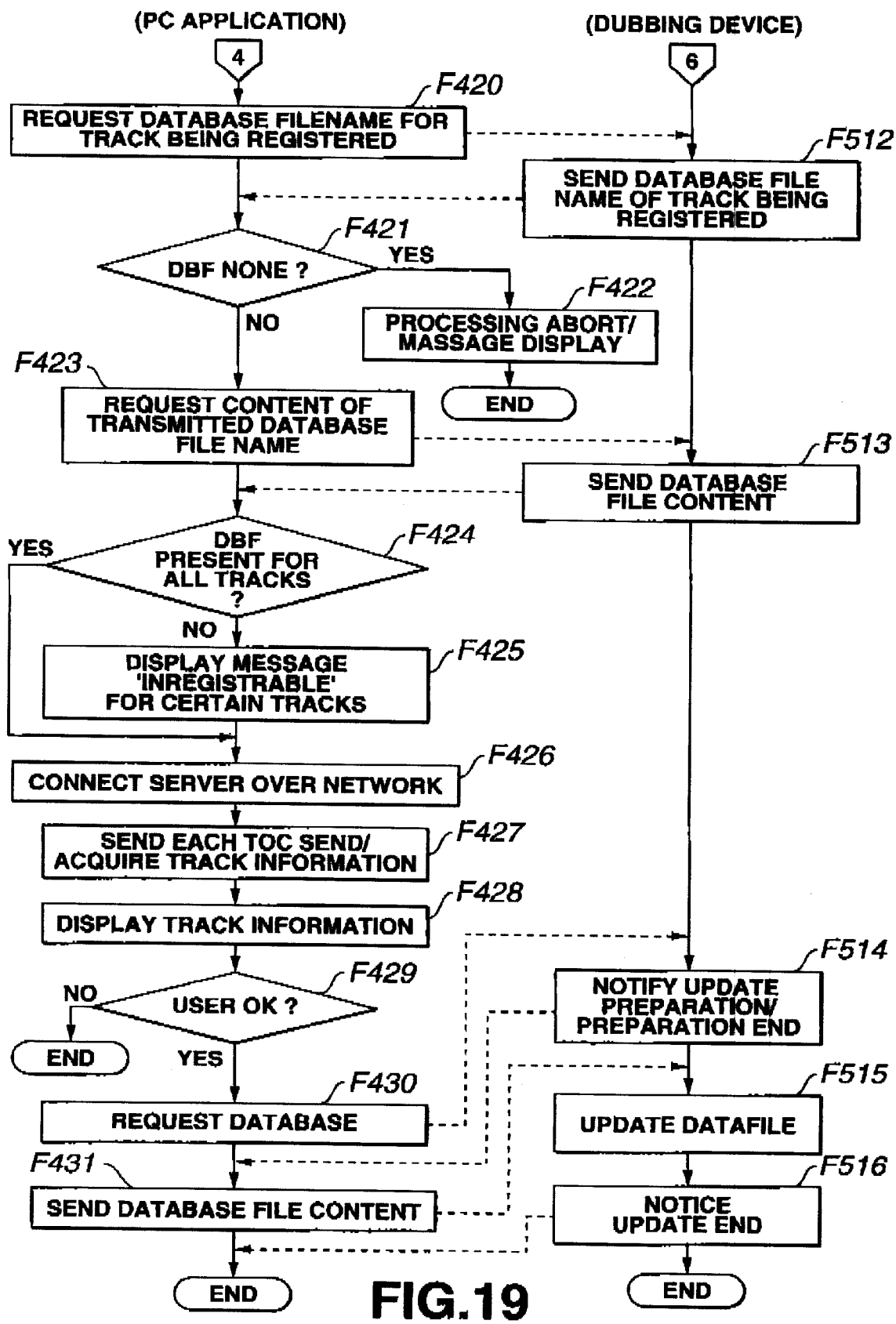

The processing of the PC application and the dubbing device 100, in case the user has requested the track-based automatic acquisition of the supplementary information at step F406 in FIG. 17, is as shown in FIG. 19. In this case, the PC application first requests, at step F429, a database filename associated with one or more target tracks to the dubbing device 100. The track(s) in question means the track(s) specified by the user. Alternatively, the PC application may automatically specify a track, where the name of the music air cannot be demonstrated on the display, as the target track. Responsive to the request by the PC application, the dubbing device 100 at step F512 sends the database filename or the database file number recorded in the target track (music data file MDF) and the track number on the database file to the PC application.

On receipt of a reply form the dubbing device 100, the PC application at step F421 checks whether or not there is no database filename associated with the target track (music data file MDF). There are present no database filename associated with the totality of the target tracks if none of the target tracks (music data files MDF) has been recorded by dubbing from a CD by the processing of FIGS. 14 to 16 as described above and if there has been formed no associated database file having the identification information, as when the target tracks have been recorded by dubbing from the external equipment having no TOC data transmitting function. If there is present no database file DBF, no supplementary information can be registered, and hence the processing is aborted at step F422, while a message indicating the effect of the abortion is demonstrated on the display for intimating such effect to the user to terminate the processing.

If at least one database filename is returned, the PC application at step F423 requests the contents of the so returned one or more database files DBF to the dubbing device 100. Responsive thereto, the dubbing device 100 at step F513 sends the contents of the requested database file DBF to the PC application. The contents of the database file DBF returned to the PC application may be the entire data. However, the portion of the entire data corresponding to the aforementioned identification information, generated on the basis of the TOC data, may also suffice. From the contents of the database file DBF, the PC application is able to grasp the identification information of the CD album of the source of dubbing for each target track. Of course, since the track number on the database file DBF, recorded in the music data file MDF, has been acquired with the transmission at step F512, the track number of the target track in the CD album of the dubbing source has been grasped.

Meanwhile, if it is determined that the database files DBF of the totality of the target tracks of step F421 do exist and the processing has not been aborted, there are occasions where no database file DBF exists for a fraction of the target tracks. If there is no database file DBF for a fraction of the target tracks, the PC application proceeds from step F124 to step F425 to intimate to the user on the display that the supplementary information cannot be acquired for a fraction of the tracks. The track(s) where there is no database file DBF are omitted from the subject of tile automatic acquisition processing.

If the contents, specifically the identification information, of the database file DBF of the target track, have been obtained, the PC application initiates the actual automatic supplementary information acquisition processing.

That is, the PC application at step F426 the PC application at step F414 sets up the network connection at step F426 for establishing connection to a preset external server extending supplementary information supplying services. At step F427, the PC application sends the TOC data recorded on the database file DBF, that is the aforementioned identification information, and the track number of the target track, and requests the supplementary information, such as the name of the music air, pertinent to the CD indicated in the identification information. The external server discriminates a specified CD album, using the TOC data as a key. The external server also extracts, from the transmitted track number, the supplementary information of the track required by the personal computer 100, to send the so extracted supplementary information.

If there are plural target tracks, the PC application sends the identification information and the track number, for each of the tracks, while the external server sends the supplementary information to each such transmission.

On receipt of the supplementary information from the external server, the supplementary information is demonstrated at step F428 on the display. For example, actual names of the music airs are demonstrated for tracks so far demonstrated as the filenames on the HDD 32. The user may be clearly informed in this manner of what music air a given track of a given album stored in the HDD 32 represents. In actual registration, the user's intention is confirmed. That is, the PVC application at step F429 demonstrates on the display a message inquiring whether or not the currently acquired supplementary information, such as the name, demonstrated on the display, can be registered in association with the track. The user then makes a response thereto. If the user has made a decision that the registration is unnecessary, the processing is straightly terminated. If the user has requested the registration, the PC application proceeds to step F430 to send a request for updating the database file DBF to the dubbing device 100. Responsive thereto, the dubbing device 100 at step F514 prepares for updating the database file DBF. When the preparations have come to a close, the dubbing device 100 makes a response as to the completion of the preparations.

The PC application at step F431 sends the contents of the database file DBF, that is the supplementary information received from the external server, to the dubbing device 100, which dubbing device 100 then proceeds at step F515 to write the returned supplementary information in the database file DBF by way of performing an update operation. If plural database files DBF are to be updated, the update operation of each database file DBF is updated in similar manner. If the update operation has been finished in its entirety, the dubbing device 100 sends an update end notification to the PC application to terminate the processing.

By the above-described processing, the supplementary information is automatically acquired from the external server, and the so acquired supplementary information is registered in the pertinent database file DBF, by way of performing update processing. For example, if, at a time point prior to such processing, no supplementary information has been registered in the database file DBF for a fi-action of the music data files MDF, supervised by a given music air play order management file PFM, the supplementary information for such music data file MDF (track) is acquired, and registered in the associated database file DBF.

Since the processing of automatic acquisition of the supplementary information is carried out in this manner on the album or track basis, the user does not have to input e.g., the name of the music air for himself for a music air recorded by dubbing on the HDD 32. After automatic registration, the name of the music air or the album name for each music data file MDF is displayed (display at step F403 of FIG. 17). Thus, the contents (music airs) recorded in the HDD 32 can be grasped readily. Of course, if the supplementary information has been registered, it may be displayed, whereby the user is withheld from making a request unawares for automatic registration a second time, thus avoiding wasteful communication connections.

10. Other Embodiments

The present invention is not limited to the above-described embodiments or illustrative operations, and may comprise variegated modifications.

Although the album-based processing and the track-based processing for automatically acquiring the supplementary information have been described in the foregoing, one of them may be applied.

In the above-described embodiment, directed to the album-based processing, the processing is carried out when the music airs contained in the album on the HDD 32 by the music airplay order management file PFM (music data file MDF) and the music airs recorded in the CD album of the dubbing source are completely coincident with each other. Alternatively, the processing of automatic acquisition of the supplementary information may also be carried out in case of non-coincidence of the music airs. For example, the decision of steps F410 or F412 of FIG. 18 maybe omitted and the processing of album-based automatic acquisition of the supplementary information may be performed on one or more database files DBF.

The structure of the data management apparatus according to the present invention is not limited to that shown in FIG. 1. In particular, the device portion corresponding to the communication means may be provided in the dubbing device and the personal computer may be dispensed with. Alternatively, the CD reproducing unit and the HD recording and/or reproducing unit may be arranged as respective separate devices.

In the dubbing processing or in the processing of album-based automatic acquisition of the supplementary information, notifications or commands transmitted between the system controller 1, CD controller 21, HD controller 31 or the PC application is merely illustrative, such that the entities or contents of the transmission/reception of the notifications or commands may, of course, be optionally changed depending on the actual structures.

The databases or the music air play order management files PFM may be stored not in the HDD 32 and a non-volatile memory may be provided in other places.

The identification information discriminating the respective CDs may be any suitable supplementary information or a manufacture lot number in addition to the information prepared from the TOC data. That is, the information by which the external sever may identify a given CD suffices.

The first recording medium is not limited to a CD and may also be an MD, a memory card or DATA, while the second recording medium is not limited to the HDD and may also be a solid-state memory or other disc-shaped recording medium or a tape-shaped recording medium.

INDUSTRIAL APPLICABILITY

According to the present invention, as described above, the data recorded by dubbing from the first recording medium to the second recording medium is supervised by database means, while the identification information of the first recording medium is supervised to enable the supplementary information to be obtained through communication means from the external server, and the so produced supplementary information is automatically registered in the database means to permit the supplementary information such as the names of the music airs to be acquired even in the absence of a user input. As a consequence, there may be produced a advantage that, if the user does not perform a laborious operation of inputting letters or characters by an operating system, the track names, album names or the information subsidiary to the album may be obtained extremely readily. In particular, the user feels ease in constructing a music server employing the HDD.

For example, a large capacity recording medium, such as HDD, is able to store a number of music airs which is larger beyond comparison than is possible with the conventional recording medium. Thus, it would be a great aid in a user searching a desired track from the HDD that a name of the music air or the album name is automatically accorded to the recorded music air.

By having the identification information generated on the basis of the management information recorded on the first recording medium, the first recording medium can be discriminated definitely. Since the first recording medium can be discriminated definitely on the external server, it is possible to produce correct supplementary information. Of course, the user need not set the identification information.

The program-based data, recorded on the second recording medium, has the pointer information indicating the database file that is associated with the data. That is, the database management can be achieved on the program or track basis. As a consequence, optimum data management can be accomplished without regard to the units of for example, the CD album of the source of dubbing.

For example, if the music air structure on the second recording medium, managed on the album basis in the second recording medium, is collapsed by the user's editing operation, such as track movement or erasure, the state of correctly supervising the names of the music airs or the subsidiary information may be maintained by supervising the music airs on the track basis.

When the user collects only favorite music airs from a number of CDs on the second recording medium to form an album, track-based management of the music airs assures correct management of the supplementary information, such as the names of the music airs.

By providing a data group management file, supervising one or more data, as program-based unit data, to be reproduced in a preset order, it is possible to supervise data such as a large number of music airs as a sole album on the second recording medium, thus improving the ease in reproduction for the user.

Moreover, if each data of the group of data being supervised has the pointer information indicating one or more associated database files, the data group management file is able to refer to database files even from the data group management file.

The control means causes the communication means to transmit the identification information of the first recording medium supervised by the database means to the external server. The supplementary information for the entire first recording medium is received from the external server, and the so received supplementary information is stored in association with the identification information in the database means, thereby producing the supplementary information from one album to another, as an example.

Moreover, by having the supplementary information for a certain program received and by having the so received supplementary information stored in the database means in association with the identification information, it is also possible to obtain the track-based supplementary information.

As may be seen from above, an optimum supplementary information acquisition operation may be achieved, in dependence upon e.g., the data or album structure on the second recording medium or upon the presence of tracks which have already acquired the supplementary information. For example, if certain data of the group of data, supervised as a sole album, has already acquired the supplementary information, it is unnecessary to acquire the supplementary information for such data, so that the operation of acquiring the supplementary information can be omitted to realize efficient acquisition of the supplementary information. In particular, in an apparatus for domestic use it highly beneficial for a user that the communication time is shortened by the efficient supplementary information acquisition operation.

The invention claimed is:

1. A data management apparatus comprising:

reproducing means for reproducing contents data from a portable first recording medium;

recording and reproducing means for recording or reproducing a second recording medium having a capacity larger than that of said first recording medium; database generating means for generating a database for storing an identification information and supplementary information corresponding to contents data stored in said first recording medium, in association with contents data reproduced from said first recording medium by said reproducing means, said contents data being recorded on said second recording medium by said recording and reproducing means;

communication means for communicating with an external server holding the supplementary information in association with said contents data reproduced from said first recording medium; and controlling means for controlling:

storing of said identification information read from said first recording medium to said database when said first recording medium is loaded in said reproducing means, transmitting said identification information stored in said database through said communication means to said external server, receiving from the external server the supplementary information corresponding to said contents data reproduced from said first recording medium, and updating said database by storing the received supplementary information in association with said identification information;

wherein said database is generated when said contents data stored in said first recording medium is recorded in said second recording medium, and is updated when said supplementary information is received from said external server.

2. The data management apparatus according to claim 1, wherein one or more programs and management information for supervising the program are recorded on said first recording medium, and wherein said identification information is generated based on said management information.

3. The data management apparatus according to claim 1, wherein one or more programs are recorded on said first recording medium;

wherein data reproduced from said first recording medium by said reproducing means and recorded on said second recording medium by said recording or reproducing means is made program-based data;

wherein said database includes a database file including said identification information and the supplementary information as one unit; and wherein the program-based data recorded on said second recording medium includes the pointer information indicating said database file associated with said data.

4. The data management apparatus according to claim 1, wherein one or more programs are recorded on said first recording medium; and wherein the data reproduced by said reproducing means from said first recording medium and recorded by said recording and reproducing means on said second recording medium is made said program-based data and includes a data group management file for supervising one or plural data of said program-based data as a group of data that are to be reproduced in a preset order.

5. The data management apparatus according to claim 4, wherein said database stores said identification information and said supplementary information as one unit and stores said data group management file including pointer information indicating one or more database files associated with each data of the group of data to be supervised.

6. The data management apparatus according to claim 1, wherein said controlling means causes said communication means to send the identification information stored in the database to an external server to cause the supplementary information pertaining to the entire contents data reproduced from said first recording medium to be received from the external server and to store the received supplementary information in said database in association with said identification information.

7. The data management apparatus according to claim 1, wherein said controlling means causes said communication means to send the identification information stored in said database to an external server to cause the supplementary information pertaining to at least one content data reproduced from said first recording medium to be received from the external server and to store the received supplementary information in said database in association with said identification information.

* * * * *